US011361470B2

(12) United States Patent
Chiu et al.

(10) Patent No.: US 11,361,470 B2
(45) Date of Patent: Jun. 14, 2022

(54) SEMANTICALLY-AWARE IMAGE-BASED VISUAL LOCALIZATION

(71) Applicant: SRI International, Menlo Park, CA (US)

(72) Inventors: Han-Pang Chiu, Princeton, NJ (US); Zachary Seymour, Pennington, NJ (US); Karan Sikka, Lawrenceville, NJ (US); Supun Samarasekera, Skillman, NJ (US); Rakesh Kumar, West Windsor, NJ (US); Niluthpol Mithun, Lawrenceville, NJ (US)

(73) Assignee: SRI International, Menlo Park, CA (US)

( * ) Notice: Subject to any disclaimer, the term of this patent is extended or adjusted under 35 U.S.C. 154(b) by 288 days.

(21) Appl. No.: 16/667,047

(22) Filed: Oct. 29, 2019

(65) Prior Publication Data

US 2020/0357143 A1    Nov. 12, 2020

Related U.S. Application Data

(60) Provisional application No. 62/845,608, filed on May 9, 2019.

(51) Int. Cl.
*G01S 17/89* (2020.01)
*G01S 7/48* (2006.01)
(Continued)

(52) U.S. Cl.
CPC ............... *G06T 7/97* (2017.01); *G01S 17/89* (2013.01); *G06F 16/5838* (2019.01)

(58) Field of Classification Search
None
See application file for complete search history.

(56) References Cited

U.S. PATENT DOCUMENTS

| 2016/0379055 A1* | 12/2016 | Loui | G06K 9/6224 |
| | | | 382/103 |
| 2020/0193245 A1* | 6/2020 | Divakaran | G06K 9/4609 |
| 2021/0312205 A1* | 10/2021 | Meidar | G06K 9/6215 |

OTHER PUBLICATIONS

Schbnberger et al., "Semantic Visual Localization," arXiv: 1712.05773, Dec. 2017 (Year: 2017).*

(Continued)

*Primary Examiner* — Soo Shin
(74) *Attorney, Agent, or Firm* — Moser Taboada

(57) ABSTRACT

A method, apparatus and system for visual localization includes extracting appearance features of an image, extracting semantic features of the image, fusing the extracted appearance features and semantic features, pooling and projecting the fused features into a semantic embedding space having been trained using fused appearance and semantic features of images having known locations, computing a similarity measure between the projected fused features and embedded, fused appearance and semantic features of images, and predicting a location of the image associated with the projected, fused features. An image can include at least one image from a plurality of modalities such as a Light Detection and Ranging image, a Radio Detection and Ranging image, or a 3D Computer Aided Design modeling image, and an image from a different sensor, such as an RGB image sensor, captured from a same geo-location, which is used to determine the semantic features of the multi-modal image.

20 Claims, 12 Drawing Sheets

(51) Int. Cl.

| | |
|---|---|
| *G06F 16/583* | (2019.01) |
| *G06K 9/62* | (2022.01) |
| *G06T 7/00* | (2017.01) |
| *G06T 7/73* | (2017.01) |
| *G06V 10/44* | (2022.01) |
| *G06V 10/82* | (2022.01) |
| *G06V 20/00* | (2022.01) |

(56) References Cited

OTHER PUBLICATIONS

Garg et al., "LoST? Appearance-Invariant Place Recognition for Opposite Viewpoints using Visual Semantics," arXiv: 1804.05526, Proceedings of Robotics: Science and Systems XIV, 2018 (Year: 2018).*

R. Arandjelovic, P. Gronat, A. Torii, T. Pajdla, and J. Sivic. NetVLAD: CNN architecture for weakly supervised place recognition. In CVPR, pp. 5297-5307, 2016. 1, 2, 4, 5.

R. Arandjelovi'c and A. Zisserman. DisLocation: Scalable descriptor distinctiveness for location recognition. In ACCV, pp. 188-204, 2014. 1, 2.

R. Arandjelovi'c and A. Zisserman. Visual vocabulary with a semantic twist. In ACCV, pp. 178-195, 2014. 2, 3A. Babenko and V. Lempitsky. Aggregating local deep features for image retrieval. In ICCV, pp. 1269-1277, 2015. 2.

A. Babenko and V. Lempitsky. Aggregating local deep features for image retrieval. In ICCV, pp. 1269-1277, 2015. 2.

Z. Chen, A. Jacobson, N. Sünderhauf, B. Upcroft, L. Liu, C. Shen, I. Reid, and M. Milford. Deep learning features at scale for visual place recognition. In ICRA, pp. 3223-3230, 2017. 3, 4, 5, 6.

Z. Chen, O. Lam, A. Jacobson, and M. Milford. Convolutional neural network-based place recognition. arXiv preprint arXiv:1411.1509, 2014. 2.

Z. Chen, L. Liu, I. Sa, Z. Ge, and M. Chli. Learning context flexible attention model for long-term visual place recognition. IEEE Robotics and Automation Letters, 3(4):4015-4022, 2018. 3.

Z. Chen, F. Maffra, I. Sa, and M. Chli. Only look once, mining distinctive landmarks from convnet for visual place recognition. In IROS, pp. 9-16, 2017. 3.

M. Cummins and P. Newman. FAB-MAP: Probabilistic localization and mapping in the space of appearance. The International Journal of Robotics Research, 27(6):647-665, 2008. 2.

M. Cummins and P. Newman. Appearance-only SLAM at large scale with FAB-MAP 2.0. The International Journal of Robotics Research, 30(9):1100-1123, 2011. 2.

A. Fukui, D. H. Park, D. Yang, A. Rohrbach, T. Darrell, and M. Rohrbach. Multimodal compact bilinear pooling for visual question answering and visual grounding. arXiv preprint arXiv:1606.01847, 2016. 4.

R. Gomez-Ojeda, M. Lopez-Antequera, N. Petkov, and J. Gonzalez-Jimenez. Training a convolutional neural network for appearance-invariant place recognition. arXiv preprint arXiv:1505.07428, 2015. , 3.

K. He, X. Zhang, S. Ren, and J. Sun. Deep residual learning for image recognition. In CVPR, pp. 770-778, 2016. 6.

A. Irschara, C. Zach, J.-M. Frahm, and H. Bischof. From structure-from-motion point clouds to fast location recognition. In CVPR, pp. 2599-2606, 2009. 1.

N. Radwan, A. Valada, and W. Burgard. VLocNet++: Deep multitask learning for semantic visual localization and odometry. arXiv preprint arXiv:1804.08366, 2018.

T. Sattler, A. Torii, J. Sivic, M. Pollefeys, H. Taira, M. Okutomi, and T. Pajdla. Are large-scale 3D models really necessary for accurate visual localization? In CVPR, pp. 6175-6184, 2017. 1, 2.

J. L. Schönberger, M. Pollefeys, A. Geiger, and T. Sattler. Semantic visual localization. In CVPR, 2018. 1, 2, 3, 7.

N. Sünderhauf, S. Shirazi, F. Dayoub, B. Upcroft, and M. Milford. On the performance of convnet features for place recognition. In IROS, pp. 4297-4304, 2015. 1.

G. Tolias, R. Sicre, and H. Jégou. Particular object retrieval with integral max-pooling of CNN activations. arXiv preprint arXiv:1511.05879, 2015. 3.

A. Torii, R. Arandjelovic, J. Sivic, M. Okutomi, and T. Pajdla. 24/7 place recognition by view synthesis. In CVPR, pp. 1808-1817, 2015. 1, 2, 5, 6.

A. Torii, J. Sivic, T. Pajdla, and M. Okutomi. Visual place recognition with repetitive structures. In CVPR, pp. 883-890, 2013. 1, 6.

S. Woo, J. Park, J.-Y. Lee, and I. S. Kweon. CBAM: Convolutional block attention module. In ECCV, 2018. 2, 3, 4.

C.-Y. Wu, R. Manmatha, A. J. Smola, and P. Krähenbühl. Sampling matters in deep embedding learning. In ICCV, 2017. 6.

H. Xu and K. Saenko. Ask, attend and answer: Exploring question-guided spatial attention for visual question answering.In ECCV, pp. 451-466, 2016. 2.

Y. Zhu, J. Wang, L. Xie, and L. Zheng. Attention-based pyramid aggregation network for visual place recognition. In ACM MM, pp. 99-107, 2018. 1, 2, 4, 5, 6.

* cited by examiner

| Method | Semantic | Individual Attention | Multimodal Attention | Nordland Sun.→Win. | St. Lucia Average | St. Lucia Worst | RobotCar AM→PM | RobotCar Sun.→Win. |
|---|---|---|---|---|---|---|---|---|
| App [Baseline] | | | | 58.0 | 71.4 | 55.5 | 36.6 | 79.6 |
| App+Sem | X | | | 74.6 | 74.9 | 60.6 | 61.4 | 87.9 |
| App-Att | | X | | 74.2 | 74.0 | 60.3 | 60.9 | 86.5 |
| App-Att+Sem-Att | X | X | | 68.5 | 73.9 | 58.9 | 62.9 | 83.6 |
| Visual localization (proposed) | X | | X | 77.3 | 78.3 | 69.1 | 67.3 | 88.5 |
| DenseVLAD[50] | | | | 19.2 | 64.5 | 35.5 | 22.9 | 78.6 |
| NetVLAD[4] | | | | 36.7 | 57.7 | 33.1 | 37.0 | 86.8 |
| AMOSNet* [8] | | | | 45.6 | 75.3 | 63.7 | 45.3 | 75.1 |
| APANet* [60] | | | | 27.0 | 42.4 | 26.1 | 11.2 | 58.2 |
| APANet-MM* [60] | X | | | 24.9 | 41.2 | 23.0 | 16.4 | 58.3 |

FIG. 3

|   | Method | Ground RGB | | Aerial Lidar | | Evaluation Metric | | | | | |
|---|---|---|---|---|---|---|---|---|---|---|---|
|   |   | Appearance | Semantic | Appearance | Semantic | R@1 | R@5 | R@10 | MedR | 5m R@1 |
| 1.1 | App-App | ✓ | | ✓ | | 20.3 | 39.0 | 45.1 | 19 | 26.4 |
|   | Sem-Sem | | ✓ | | ✓ | 10.6 | 26.8 | 34.8 | 38 | 14.1 |
|   | App-Sem | ✓ | | | ✓ | 9.5 | 24.3 | 32.0 | 48 | 12.6 |
|   | Sem-App | | ✓ | ✓ | | 18.6 | 37.2 | 43.6 | 22 | 24.4 |
| 1.2 | [AppSem]-App | ✓ | ✓ | ✓ | | 20.4 | 40.9 | 49.1 | 16 | 27.9 |
|   | [AppSem]-[AppSem] | ✓ | ✓ | ✓ | ✓ | 19.5 | 41.2 | 51.6 | 15 | 27.2 |
| 1.3 | App-App + Sem-App | ✓ | ✓ | ✓ | | 24.8 | 45.5 | 51.8 | 9 | 31.5 |
|   | App-App+App-Sem | ✓ | | ✓ | ✓ | 22.9 | 44.7 | 52.0 | 9 | 29.2 |
|   | App-App+Sem-App+App-Sem | ✓ | ✓ | ✓ | ✓ | 26.7 | 49.5 | 56.3 | 6 | 33.7 |
|   | App-App+Sem-App+App-Sem+Sem-Sem | ✓ | ✓ | ✓ | ✓ | 27.6 | 51.1 | 57.9 | 5 | 34.5 |

FIG. 10

SEMANTICALLY-AWARE IMAGE-BASED VISUAL LOCALIZATION

CROSS-REFERENCE TO RELATED APPLICATION

This application claims priority to and the benefit of U.S. Provisional Patent Application Ser. No. 62/845,608, filed May 9, 2019 which is incorporated herein by this reference in its entirety.

FIELD

Embodiments of the present principles generally relate to image-based localization, and more particularly, to methods, apparatuses, and systems for semantically-aware image-based localization.

BACKGROUND

Accurately estimating the location from which a photo was taken in, for example, large-scale environments can be crucial to applications in such fields as robotics, augmented reality, virtual tourism, and autonomous navigation, to name a few. The problem of accurately estimating the location from which a photo was taken, also referred to as visual localization, needs to function under changing conditions such as illumination (day/night), weather (sunny/snow), and seasons (summer/winter). Visual localization also needs to address dynamic scene changes and occlusions, such as roadwork, pedestrians, and moving cars in urban cities, to name a few.

Some current implementations of visual localization utilize two broad classes of methods: 3D structure-based localization (3D-VL) and 2D image-based localization (2D-VL). Both methods typically rely on using local or global low-level appearance descriptors for pose estimation. Some 3D-VL methods typically associate a local descriptor with each point in a 3D model of the scene, while some 2D-VL methods extract a holistic descriptor or multiple local descriptors for query-based matching. A primary drawback with methods using low-level features is that such methods are not robust to changes in viewing conditions. In addition, 3D models are less scalable and present greater computational complexity.

SUMMARY

Embodiments of methods, apparatuses and systems for semantically-aware image-based localization are disclosed herein.

In some embodiments in accordance with the present principles, a method for visual localization includes extracting appearance features of an image using a first neural network and spatial attention, extracting semantic features of the image using a second neural network and spatial attention, fusing the extracted appearance features and semantic features, pooling and projecting the fused features into a semantic embedding space having been trained using fused appearance and semantic features of images having known locations, computing a similarity measure between the projected fused features and embedded, fused appearance and semantic features of images in the semantic embedding space having known locations, and predicting a location of the image associated with the projected, fused features by determining nearest embedded, fused appearance and semantic features to the projected, fused features of the image in the semantic embedding space based on the similarity measures computed for the projected, fused features of the image.

In some embodiments in the method for visual localization the image includes one of a Light Detection and Ranging image, a Radio Detection and Ranging image, or a 3D Computer Aided Design modeling image, and an image from a different sensor captured from a same geo-location as the one of a Light Detection and Ranging image, a Radio Detection and Ranging image, or a 3D Computer Aided Design modeling image is used to determine the semantic features of the image.

In some embodiments the method for visual localization further includes generating a common embedding space for determining the semantic features of the one of a Light Detection and Ranging image, a Radio Detection and Ranging image, or a 3D Computer Aided Design modeling image, where the generating includes capturing image pairs from a same geo-location using at least two different sensors, and embedding the captured image pairs in the common embedding space such that embedded image pairs that are related are closer together in the common embedding space than unrelated image pairs.

In some embodiments in the method for visual localization the at least two different sensors include an RGB image sensor and a Light Detection and Ranging image sensor.

In some embodiments in accordance with the present principles, a method of creating a semantic embedding space for improved visual localization of an image includes for each of a plurality of images having known locations, extracting appearance features of an image using a first neural network and spatial attention, extracting semantic features of the image using a second neural network and spatial attention, fusing the extracted appearance features and semantic features, creating a feature vector representation of the fused features, and semantically embedding the feature vector in a semantic embedding space such that embedded feature vectors that are related are closer together in the semantic embedding space than unrelated feature vectors.

In some embodiments in accordance with the present principles, an apparatus for visual localization of an image includes an appearance detection module to extract appearance features of the image using a first neural network including spatial attention, a semantic feature module to extract semantic features of the image using a second neural network including spatial attention, a modality fusion module to fuse the appearance features and the semantic features using a shared channel attention, an attention module to determine the spatial attention for the appearance features and the semantic features and to determine the shared channel attention for the fused features, and a pooling module to pool the fused features and project the fused features into a semantic embedding space having been trained using fused appearance and semantic features of images having known locations, compute a similarity measure between the projected, fused features and embedded, fused appearance and semantic features of images in the semantic embedding space having known locations, and predict a location of the image associated with the projected, fused features by determining nearest embedded, fused appearance and semantic features to the projected, fused features of the image in the semantic embedding space based on the similarity measures computed for the projected, fused features of the image.

In some embodiments of the apparatus, the image includes one of a Light Detection and Ranging image, a Radio Detection and Ranging image, or a 3D Computer Aided Design modeling image, and the semantic feature module is further configured to use an image from a different sensor captured from a same geo-location as the one of a Light Detection and Ranging image, a Radio Detection and Ranging image, or a 3D Computer Aided Design modeling image to determine the semantic features of the image.

In some embodiments, the apparatus is further configured to generate a common embedding space for determining the semantic features of the one of a Light Detection and Ranging image, a Radio Detection and Ranging image, or a 3D Computer Aided Design modeling image, where the generating includes capturing image pairs from a same geo-location using at least two different sensors, and embedding the captured image pairs in the common embedding space such that embedded image pairs that are related are closer together in the common embedding space than unrelated image pairs.

In some embodiments, in the apparatus the at least two different sensors include an RGB image sensor and a Light Detection and Ranging image sensor.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

FIG. 3 depicts a table of the performance of a visual localization system in accordance with an embodiment of the present principles.

FIG. 10 depicts a Table 1 highlighting the benefits of using semantic information for visual localization and for fusion of embedding in accordance with embodiments of the present principles.

Figure 1:
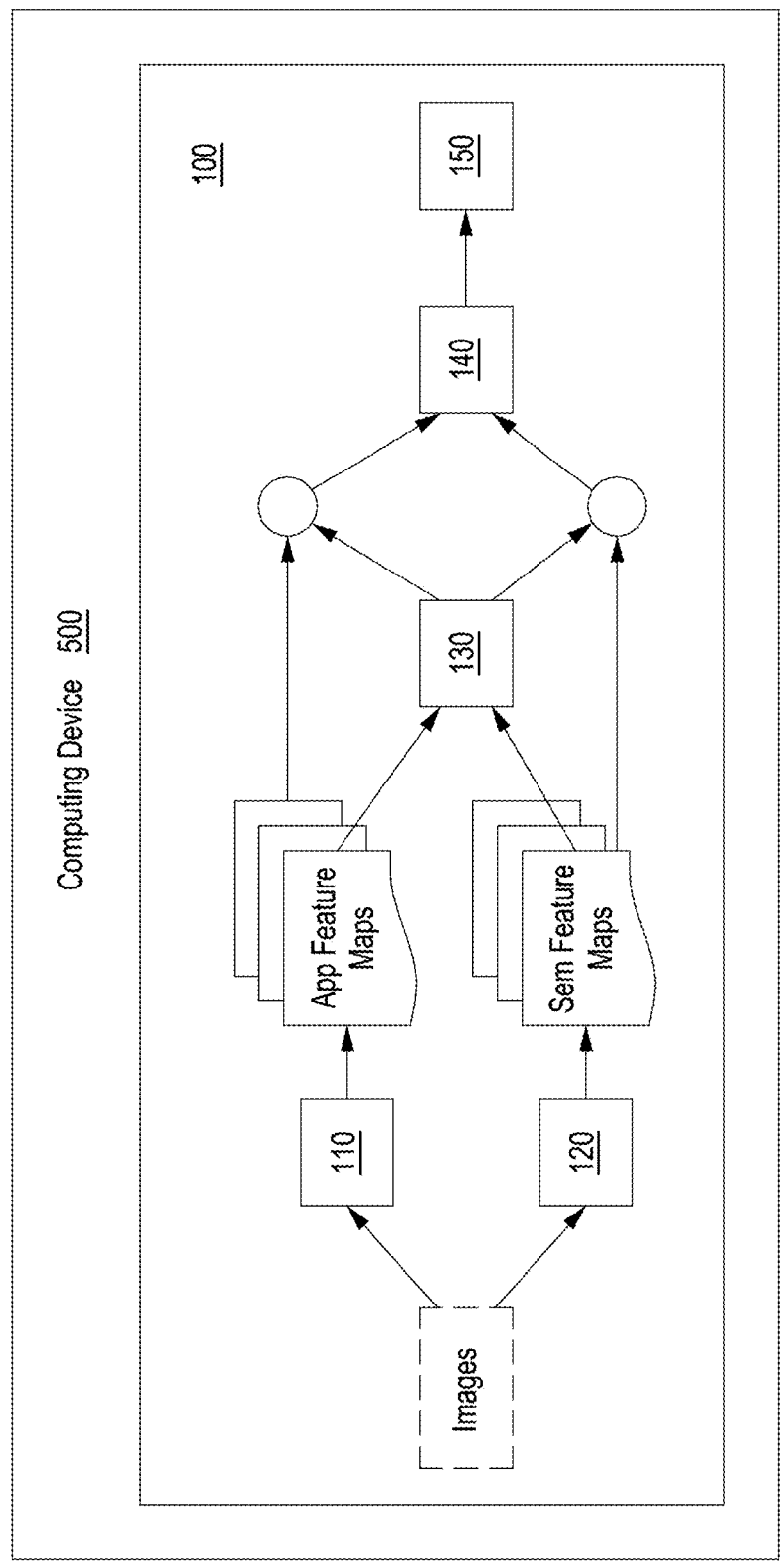
FIG. 1 depicts a high level block diagram of a system of a visual localization system in accordance with an embodiment of the present principles.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present principles generally relate to methods, apparatuses and systems for semantically-aware image-based localization. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims. For example, although embodiments of the present principles will be described primarily with respect to particular embedding and feature detection techniques, such teachings should not be considered limiting. Embodiments in accordance with the present principles can be implemented using other embedding and feature detection techniques within the concepts of the present principles.

Embodiments in accordance with the present principles provide methods, apparatuses and systems for semantically-aware image-based localization. In some embodiments in accordance with the present principles, neural networks, such as deep, convolutional neural networks, are implemented to improve the robustness of learned visual embeddings in a semantic embedding space by incorporating high-level semantic information inside the neural network and by incorporating an attention-based framework that uses both mid-level appearance and high-level semantic information to guide a model to focus on informative and stable image regions. That is, embodiments in accordance with the present principles provide an end-to end trainable deep neural network that effectively combines semantic and mid-level appearance features with spatial attention to provide semantically-aware image-based localization.

FIG. 1 depicts a high level block diagram of a visual localization system 100 in accordance with an embodiment of the present principles. The visual localization system 100 of FIG. 1 illustratively comprises a visual feature extraction module 110, a semantic feature extraction module 120, an attention module 130, a modality fusion module 140, and a spatial pooling module 150.

As depicted in FIG. 1, embodiments of a visual localization system can be implemented in a computing device 500 (described in greater detail in FIG. 5) in accordance with the present principles. That is, in some embodiments, images and videos that can be used to train a semantic space in accordance with the present principles can be received by the visual localization system 100 from the computing device 500. In addition, images and videos for which visual localization is to be performed by a visual localization system, such as the visual localization system 100 of FIG. 1 in accordance with embodiments of the present principles, can be received by the visual localization system 100 from the computing device 500. Results of the visual localization in accordance with the present principles can be presented to a user using an output device of the computing device 500, such as a display, a printer or any other form of output device.

In some embodiments, the visual feature extraction module 110 comprises a convolutional neural network (CNN) trained to extract visual features from an input image stream. Alternatively or in addition, in some embodiments other neural networks, such as recurrent neural networks and graph neural networks, as well as other network architectures, such as support vector machines, can be used to extract visual features from an input image stream. The output of the visual feature extraction module 110 includes visual feature maps.

In some embodiments, the semantic feature extraction module 120 comprises a CNN trained to extract semantic features from the input image stream. Alternatively or in addition, in some embodiments other neural networks, such as recurrent neural networks and graph neural networks, as well as other network architectures, such as support vector machines, can be used to extract semantic features from the input image stream. The output of the semantic feature extraction module 120 includes semantic feature maps.

Figure 2:
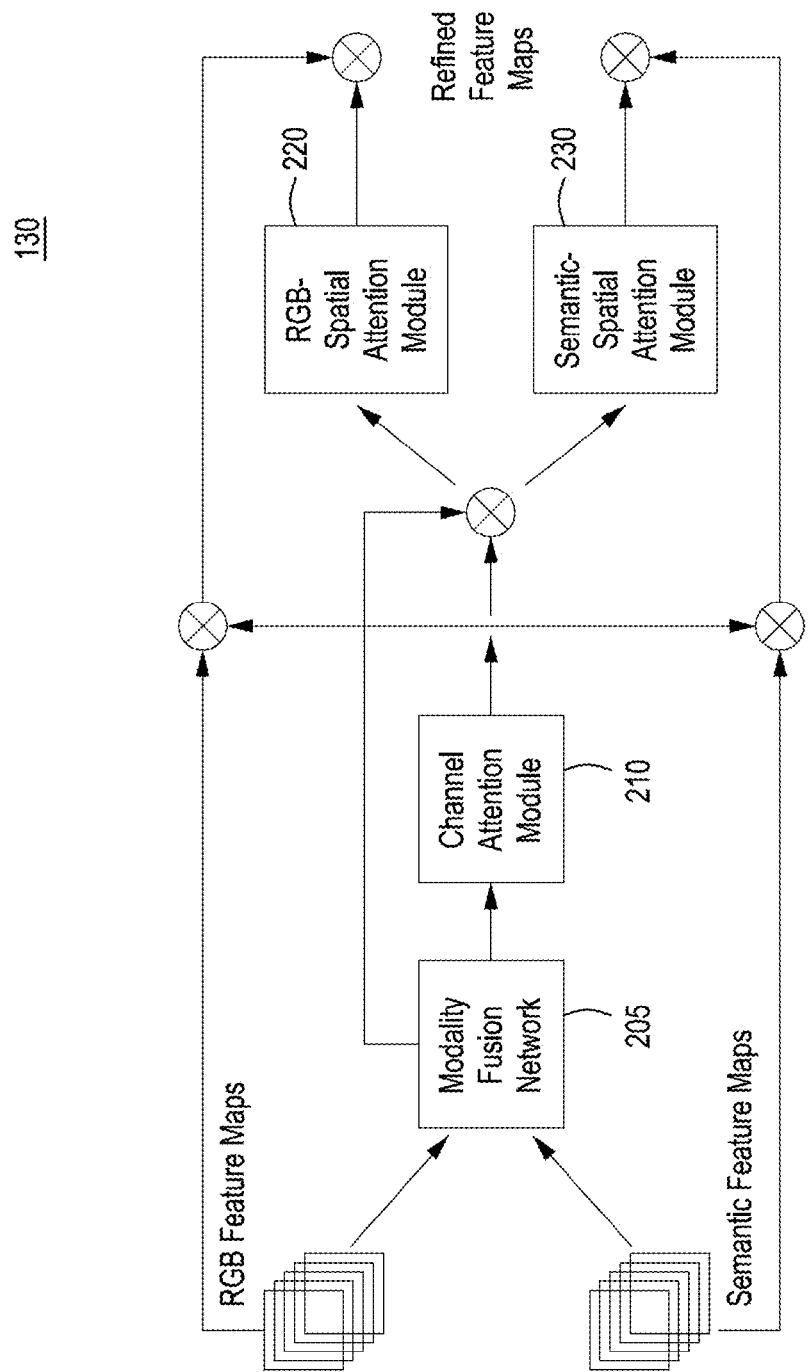
FIG. 2 depicts a high level block diagram of an attention module suitable for use in the visual localization system of FIG. 1 in accordance with an embodiment of the present principles.

In some embodiments, the attention module 130 of the present principles predicts attention at different spatial locations independently for the appearance (visual) and semantic feature maps. FIG. 2 depicts a high level block diagram of an attention module 130 suitable for use in the visual localization system 100 of FIG. 1 in accordance with an embodiment of the present principles. The attention module 130 of FIG. 2 illustratively comprises a modality fusion module 205, a channel attention module 210, an appearance spatial attention module 220 and a semantic spatial attention module 230. As depicted in the embodiment of FIG. 2, appearance and semantic feature maps are inputs to the modality fusion module 205. The output of the modality fusion module 205 is input to the channel attention module 210.

In some embodiments, the modality fusion module 205 of the attention module 130 aligns the feature maps of mid-level appearance features, $App_{mid}$, and the feature maps of high-level semantic features, $Sem_{high}$, by, in some embodiments, first projecting the appearance features and the semantic features into a common embedding space and then adding the features together.

In some embodiments, 1×1 convolutions denoted by $W_A^1 \in \mathbb{R}^{C \times C_A \times 1 \times 1}$ and $W_S^1 \in \mathbb{R}^{C \times C_S \times 1 \times 1}$ for the appearance and semantic streams respectively, are used to project the feature maps in a common embedding space according to equation one (1), which follows:

$$F^M = W_A^1 \circledast F^A + W_S^1 \circledast F^S \qquad (1)$$
$$= F_A^M + F_S^M,$$

where $F^M$ is the fused multimodal representation of the image, $F_A^M$ and $F_S^M$ are the aligned features maps from $App_{mid}$ and $Sem_{high}$ respectively, C is the number of channels in the common embedding space, and $\circledast$ is the convolutional operator. The output is a semantically-informed multimodal representation of the input and is used as input to both the attention module 130 and later to the spatial pooling module 150, whose function is described in detail below.

The attention module 130 enables a focus on discriminative and stable image regions such as buildings or landmarks instead of confusing or dynamic elements such as sky, cars, and pedestrians. A result includes embeddings that are more robust to perceptual changes, for example, in urban environments. The attention module 130 uses the combined multimodal representation determined by the modality fusion module 205 to sequentially predict a shared channel attention, in some embodiments denoted by $M_C \in \mathbb{R}^C$, and individual spatial attentions for, in some embodiments, the two modalities, denoted by $M_{xy}^A \in \mathbb{R}^{H \times W}$ and $M_{xy}^S \in \mathbb{R}^{H \times W}$ for appearance and semantic channels, respectively. In some embodiments, the channel attention is computed by summarizing the appearance and semantic feature maps across the spatial dimensions by average ($F_{avg}^M$) and max ($F_{max}^M$) pooling, and passing the appearance and semantic feature maps through a multi-layer perception (MLP) followed by an addition and a (sigmoid/sigmoidal) non-linearity according to equation two (2), which follows:

$$M_C = \sigma(\phi(F_{avg}^M) + \phi(F_{max}^M)), \qquad (2)$$

where $\sigma$ denotes the sigmoid function, $\phi$ denotes, in the described embodiment, a two-layer MLP shared across the two pooled inputs. The refined multimodal representation $\hat{F}^M$ with attended channels is then computed according to equation three (3), which follows:

$$\hat{F}^M = F \odot M_C, \qquad (3)$$

where $\odot$ denotes element-wise multiplication with appropriate broadcasting (copying) of attention values along the spatial dimension. The refined image representation is then used to predict per modality spatial attentions by, in some embodiments, using two 7×7 convolutional filters, $W_A^2$ and $W_S^2$, for appearance and semantic input streams, respectively. $\hat{F}^M$ is pooled across the channel dimension by both average ($F_{avg}^M$) and max ($F_{max}^M$) pooling, and concatenated across the channel dimension and convolved with corresponding filters. The spatial attention maps are then used with the common channel attention to attend to the transformed maps from Equation (1), above, and generate refined features denoted as $\hat{F}^A$ and $\hat{F}^S$ for $App_{mid}$ and $Sem_{high}$, respectively, according to equations four (4) and five (5) as follows:

$$M_{xy}^A = M_C \odot \sigma(\hat{W}_A^2 \circledast ([\hat{F}_{avg}^M; \hat{F}_{max}^M])) \qquad (4)$$

$$M_{xy}^S = M_C \odot \sigma(\hat{W}_S^2 \circledast ([\hat{F}_{avg}^M; \hat{F}_{max}^M])). \qquad (5)$$

In some embodiments, the final attended features $\hat{F}^A$ and $\hat{F}^S$ from the appearance and semantic input streams are computed according to equations six (6) and seven (7), which follow:

$$\hat{F}^A = F_A^M \odot M_{xy}^A \qquad (6)$$

$$\hat{F}^S = F_S^M \odot M_{xy}^S. \qquad (7)$$

The refined features, $\hat{F}^A$ and $\hat{F}^S$, for $App_{mid}$ and $Sem_{high}$ are input to the modality fusion module 140 to fuse the refined features and communicate the fused, refined features, $\hat{F}^A$ and $\hat{F}^S$, to the spatial pooling module 150. In some embodiments, the fusing of the fusion module 140 is performed according to Equation one (1), presented above.

However, in addition or alternatively, the fusion of the fusion module is performed according to more sophisticated feature fusion models, such as bilinear pooling, multi-layer perceptron, and the like.

The spatial pooling module 150 pools the data from the attended and fused features communicated from the modality fusion module 140 to generate image embeddings in a semantically aware embedding space, which can then be used to retrieve matches for a query image. In some embodiments, spatial pyramid pooling (SPP) is used in the spatial pooling module 150 since SPP does not include any trainable parameters. In some embodiments, SPP with pooling sizes of [4; 3; 2; 1] are implemented and the feature maps from all layers are concatenated to produce a final embedding. Alternatively or in addition, NetVLAD pooling can be implemented in the spatial pooling module 150. NetVLAD, is a new generalized VLAD layer, inspired by the "Vector of Locally Aggregated Descriptors" image representation commonly used in image retrieval. The layer is readily pluggable into any CNN architecture. In some embodiments, embeddings performed by the spatial pooling module 150 can be L2-normalized and scaled, for example, by a factor of 10.

In some embodiments, the spatial pooling module 150 creates a respective feature vector representation of fused, features from the modality fusion module 140 and embeds the feature vector into a semantically aware embedding space. That is, in some embodiments, initially, a geometric space, such as a semantic embedding space, is built (trained) by embedding feature vectors of images of dataset(s) fused in accordance with the present principles into the semantic embedding space. Such datasets can include the Specific Places Dataset (SPED), the Nordland dataset, the St. Lucia dataset, the Oxford RobotCar dataset and the like.

In some embodiments to train the semantic embedding space, a max-margin-based triplet ranking loss function is implemented. The max-margin-based triplet ranking loss function optimizes the embedding space such that images from similar locations are located closer in the embedding space than images from different locations. For example, given an image I, a positive matching exemplar $I_p$, and a negative exemplar $I_n$, the loss is computed according to equation eight (8), which follows:

$$\mathcal{L} = \max(0, m + d(\psi(I), \psi(I_p)) - d(\psi(I), \psi(I_n))), \quad (8)$$

where $\psi$ denotes the embeddings, m is the margin enforced between positive and negative exemplars, and d is some distance metric. In some embodiments, triplets are formed in an inline manner by sampling them from each mini-batch for computational efficiency.

Once the semantic embedding space is trained as described above, visual localization in accordance with the present principles can be performed. For example, in some embodiments, appearance and semantic features of an image to be visually localized can be extracted as described above. The features are then fused in accordance with the present principles and the fused features can be projected into the trained semantic embedding space.

The trained semantic embedding space can be used to compute a similarity measure between projected fused features of an image to be visually localized and embedded fused appearance and semantic features of images used to train the embedding space. In some embodiments in accordance with the present principles, the similarity measure is computed as a cosine similarity between at least two vectors. An image match can be predicted by finding a nearest embedded image based on a determined similarity score determined between the embedded, fused features of the image to be visually localized and embedded, fused appearance and semantic features of images used to train the semantic embedding space.

In one experimental embodiment, a version of the Specific Places Dataset (SPED) was implemented to train the semantically aware embedding space. Images from 2600 cameras were randomly sampled from the Archive of Many Outdoor Scenes and the download images were collected every half hour from February and August 2014. All images where the camera feed was corrupted, obscured, or too dark for visibility were removed. In addition, images from any cameras for which the image capture location was not fixed were removed. The final dataset included 1.3 million images drawn from 2079 cameras featuring significant scene diversity ranging from urban roads to unpopulated landscapes, and significant appearance changes due to seasonal and day-night cycles. The semantically aware embedding space was trained using the above described dataset and the performance on a visual localization task on three public datasets was evaluated as described below.

In one experiment, images from Nordland were used to perform visual localization in accordance with the present principles. Nordland is derived from continuous video footage of a train journey recorded for a Norwegian television program, recorded from the front car of the train across four different seasons. One frame per second was extracted from the first hour of each traversal, excluding images where the train is either stopped or in tunnels. This resulted in 1403 frames per traversal. A database was constructed with a summer traversal and was queried using a winter traversal. For the described experiment, the images feature no viewpoint variation, due to travel on fixed rails, however, the seasonal appearance changes are quite severe.

In another experiment, images from St. Lucia were used to perform visual localization in accordance with the present principles. St. Lucia comprises ten different traversals recorded by a forward-facing webcam affixed to the roof of a car, following a single route through the suburb of St. Lucia, Queensland, Australia. The dataset was captured at five different times of day on different days across two weeks. In one experiment, images from the first traversal were used as the database and images from the remaining nine traversals were used for queries. In such experiment, the average as well as the worst case result were reported over the nine trials. Images were sampled at one frame per second, which resulted in each traversal containing on an average 1350 frames. The resulting dataset featured slight viewpoint variations due to differences in the route taken by the vehicle and there were mild to moderate appearance changes due to differences in time of day and the presence of dynamic objects in the scene.

In another experiment, images from Oxford RobotCar were used to perform visual localization in accordance with the present principles. Oxford RobotCar comprises several different traversals of the city of Oxford by a vehicle. The images were collected across varying weather conditions, seasons, and times of day over a period of a year. In one experiment, two pairs of traversals, referred to as Overcast Autumn/Night Autumn and Overcast Summer/Snow Winter were selected. An experiment was performed by building a database with either Overcast Summer or Overcast Autumn and performing a query with Snow Winter or Night Autumn, respectively. The center stereo image from the front-facing camera was used and one frame per second was extracted. On average, each traversal covered nearly 9 km and 2000 frames. There dataset contained mild viewpoint variations due to slight differences in the starting point and road position of the traversals. The appearance change in the day-night pair was quite drastic, largely from the difference in illumination quality in the transition from sunlight to street lights, while being more moderate in the summer-winter pair, with minor variation from seasonal vegetation and ground cover.

For the datasets described above, in some experimental embodiments, results were reported as Area Under the Curve (AUC) by constructing precision-recall curves using "the ratio test" described in N. Sunderhauf, S. Shirazi, F. Dayoub, B. Uperoft, and M. Milford. *On the performance of convnet features for place recognition*; In IROS, pages 4297-4304, 2015. In brief, a match between a query image and the database is considered positive if the ratio of the Euclidean distances of the best match and the second-best match by nearest neighbor search is above some threshold, and considered a negative match otherwise. Because every frame in the test datasets has a ground truth matching frame (i.e., there are no true negatives), every negative reported by the ratio test is a false negative. A match was considered a true positive if the match was within ±5 frames of the ground truth and a false positive otherwise. A precision-recall curve was constructed by varying the threshold on the ratio test.

As described above, in some embodiments of a visual localization system in accordance with the present principles, two DCNNs are used, for example in parallel. In the experimental embodiment described above, a ResNet50 pre-trained for the Imagenet classification task for mid-level feature extraction of appearance features of input images and a Pyramid Scene Parsing Network (PSPNet) pre-trained on the ADE20K semantic segmentation task for semantic feature extraction of input images were implemented in parallel. Alternatively or in addition, in some embodiments, PSPNet pre-trained on Cityscapes can be implemented for semantic feature extraction of input images in accordance with the present principles.

In the experimental embodiment, the output of the third residual block from ResNet50 was used for mid-level appearance features ($F^A$). For high-level semantic features ($F^S$), the output before the final convolutional layer of PSPNet was used. The resulting number of channels, ($C_A$), for the appearance features and the number of channels, ($C_S$), for the semantic features were 1024 and 512, respectively. In the experimental embodiment described above, the spatial dimensions were resized from both feature maps to 14×14 and the number of channels of the common embedding space in the modality fusion module (C), both before and after the attention module 130, were set to 256. The dimensionality of the final embeddings after spatial pooling was 7680. For the experimental embodiment described above, features from both the pre-trained DCNNs running in parallel were extracted and only the two modality fusion modules 140, 205 and the attention module 130 were fine-tuned. The Adam optimizer with a learning rate of $5×10^{-5}$ and a weight decay of $5×10^{-4}$ was used for training. Inline triplet sampling was used with batches comprised of 16 different classes with 4 examples per class. Within a batch, distance-weighted triplet sampling was used to increase the stability of the training process. A margin of m=0:5 was used, selected based on giving the best performance on a small validation set.

To ensure a fair comparison with prior methods, in the experimental embodiment the same backbone DCNN—pre-trained ResNet50—was used for all methods. AMOSNet was implemented by fine-tuning all layers of the pre-trained DCNN on the SPED dataset. In addition, a method using both attention and pyramid pooling, Attention-based Pyramid Aggregation Network (APANet), was implemented.

FIG. 3 depicts a table of the performance of a visual localization system in accordance with the present principles, such as the visual localization system 100 of FIG. 1, along different baselines and prior approaches. Initially, in the table depicted in FIG. 3, the results of the visual localization system of the present principles is presented using different baselines to highlight some of the benefits of the proposed visual localization system, such as (i) the implementation of semantic information, and (ii) the implementation of a novel multimodal attention module to focus on discriminative regions.

To illustrate the benefits of semantic information, in the table of FIG. 3, the performance of the visual localization system of the present principles using only appearance information is compared with the performance of the visual localization system of the present principles using both appearance and semantic information (App+Sem). In FIG. 3, across the test datasets, there is an average increase in absolute performance from introducing the semantic information of 9%, with the largest gain (25%) on the RobotCar dataset. The Nordland dataset shows the second-largest improvement (17%) from multimodal fusion in accordance with the present principles. The table of FIG. 3 further depicts that a similar improvement is provided when an attention function, such as spatial attention function, is added to appearance information over the mere use of appearance information. That is, the data indicates that both attention and the semantic modality help to compensate for the extreme perceptual aliasing compared to the (sub)urban traversal datasets.

The remaining variants such as appearance along with attention functionality, appearance and semantic modes both including attention functions and other combinations, demonstrate the benefits of the attention modules. For example, between an implementation just using appearance features and an implementation using appearance features having an attention function applied, there is an increase in performance (8% average absolute on all datasets) caused by the attention module causing a focus on less confusing regions of an input image stream. For example, as depicted in FIG. 3, there is an improvement of 16% for the Nordland dataset between an implementation just using appearance features and an implementation using appearance features having an attention function applied. The improvements reflected in the Nordland dataset corroborate the necessity of suppressing confusing regions when several similar frames are present in the database in accordance with the present principles.

As depicted in FIG. 3 however, there is an improvement of only 3% when using the St. Lucia dataset because of the relatively smaller appearance variations present across traversals. However, the improvement across all datasets, as depicted in FIG. 3, demonstrates that introducing spatial attention with appearance information, in accordance with the present principles, results in performance gains.

However, the improvement across all datasets does not exist if attention from both modalities is naively computed with separate channel and spatial attention. For example, in an implementation that predicts separate attention over each modality only minor improvements of 2% are observed on the RobotCar dataset. Such observations demonstrate that attention is useful for suppressing confusing regions from both the appearance and semantic modalities, however since there is no interaction between the two modalities, the performance decreases (1% average decrease) on the datasets with more subtle variations between frames.

As described above, in accordance with the present principles, a visual localization system of the present principles further improves localization by using the fused multimodal image representation to predict spatial attention for each modality by first predicting an intermediate shared channel attention. As depicted in at least FIG. 3, a visual localization system of the present principles yields the best performance across all variants on each dataset (12% average absolute improvement over an implementation using only appearance features, 4% over an implementation using appearance and semantic features, and 5% over an implementation using separate attended appearance and semantic features). More specifically, as depicted in FIG. 3, both Nordland (9%) and St. Lucia (11% in the worst case) are further refined by sharing channel attention across modalities in accordance with the present principles, while the most perceptually-challenging dataset, Robot-Car, experiences a further performance increase of 4% over an implementation using separate attended appearance and semantic features and performance increase of 31% over an implementation using only appearance features.

In an experimental embodiment, the dimensionality, C, of the multimodal fusion network (modules) was varied to explore the effect of channel numbers on performance on the test datasets. As depicted in FIG. 3, the performance across all of the datasets plateaus between 128 and 256 channels and shows evidence of overfitting, particularly in the case of the Nordland dataset, above 256 channels. The inventors determined that the best dimensionality of the multimodal fusion module in accordance with the present principles can be a function of the dataset difficulty.

Figure 4:
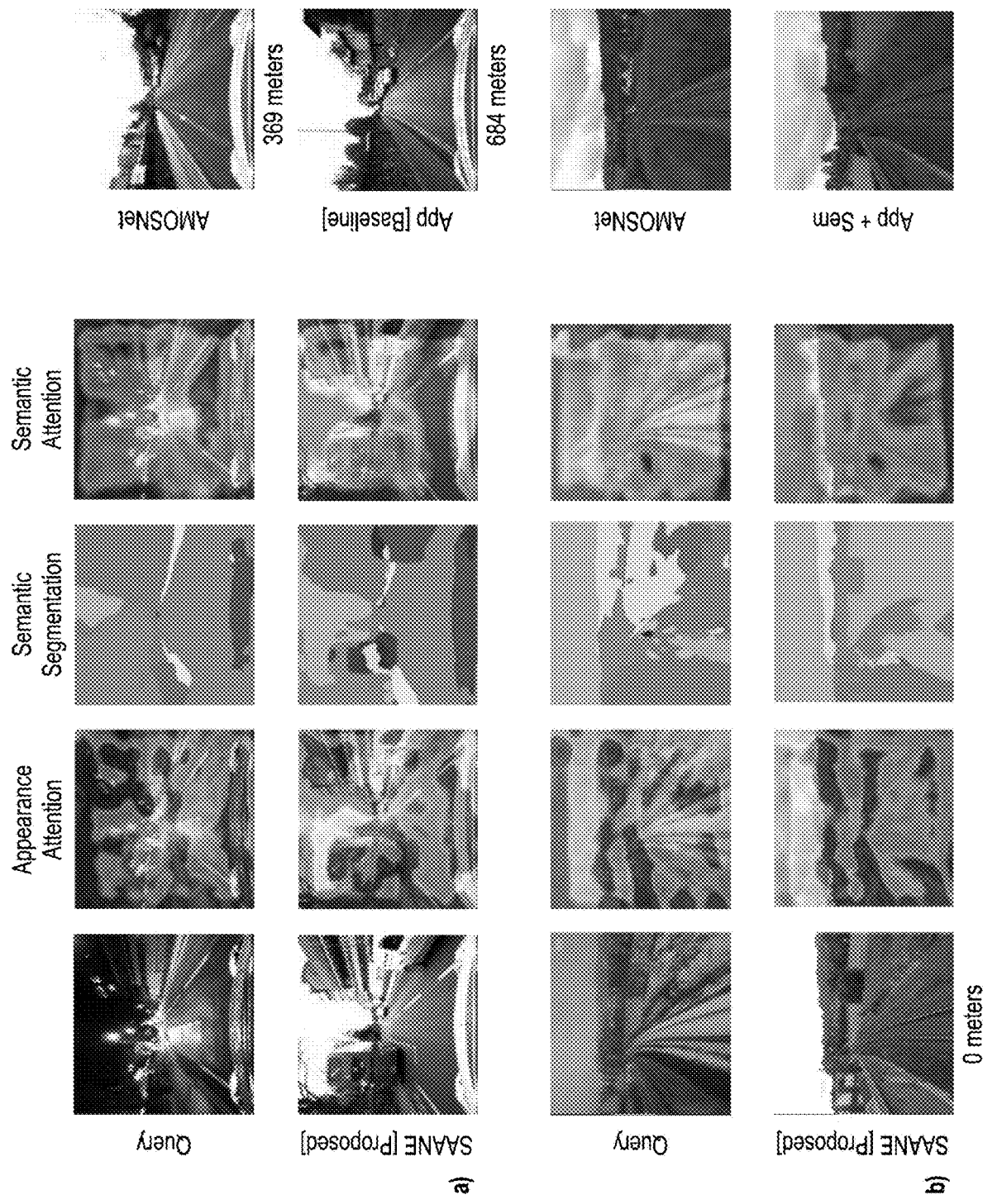
FIG. 4 depicts retrieval images for image searches for two cases with significant variations in viewing conditions in accordance with an embodiment of the present principles.

FIG. 4 depicts retrieval images for image searches for two cases with significant variations in viewing conditions in accordance with an embodiment of the present principles. FIG. 4, illustrates feature maps depicting the spatial attention from both modalities along with the semantic segmentation maps. In FIG. 4, the top two rows (FIG. 4a) depict a query image from the Night Autumn matched against retrieved database images from the Overcast Autumn set of Oxford RobotCar. As depicted in FIG. 4, for methods relying only on appearance information (i.e., AMOSNet), the retrieved images in the rightmost column of FIG. 4 are inaccurate but present similar scene layouts. In the embodiment of FIG. 4a, an image retrieved using the visual localization system in accordance with the present principles retrieves an image match within two meters of the location in the query image.

FIG. 4 depicts how, across time of day, the maps from both attention modalities remain consistent and focus on stable features, with the appearance attention focusing mostly on fine details, such as lane markings or architectural elements, and the semantic attention giving emphasis to scene layout and skyline shape. In FIG. 4, although the appearance modality attends highly to a bus's features in the matched image, as if it were any other structure, the semantic attention module has learned to disregard the region containing the bus as a dynamic object and gives more emphasis to the remaining scene layout.

In FIG. 4, in the third and fourth rows (FIG. 4b), a query image from a winter sequence of the Nordland dataset is matched against retrieved database images from a summer sequence of the Nordland dataset. In FIG. 4b, a method relying on combined appearance and semantic features without attention, retrieves an image that is very similar to the query image, however the retrieved image lacks the distinctive fence structure on the left of the image. In the embodiment of FIG. 4b, an image retrieved using the visual localization system in accordance with the present principles retrieves an image that is an exact location match of the query image.

Figure 5:
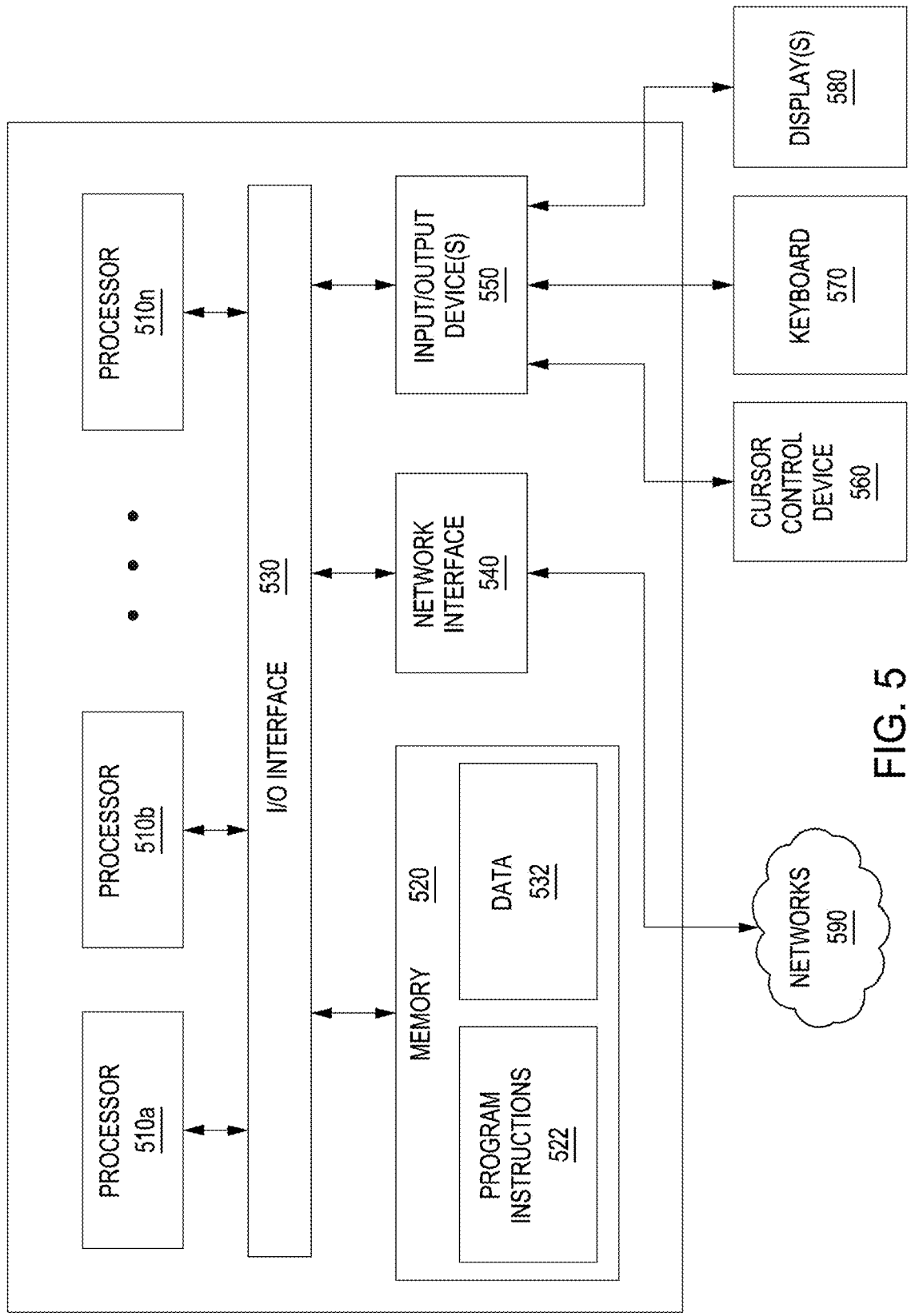
FIG. 5 depicts a high level block diagram of a computing device for implementing a visual localization system in accordance with embodiments of the present principles.

FIG. 5 depicts a high level block diagram of a computing device 500 for implementing embodiments of a visual localization system in accordance with embodiments of the present principles. In some embodiments computing device 500 can be configured to implement methods of the present principles, such as at least the method 600 and the method 700 as processor-executable executable program instructions 522 (e.g., program instructions executable by processor(s) 510) in various embodiments.

In the embodiment of FIG. 5, computing device 500 includes one or more processors 510a-510n coupled to a system memory 520 via an input/output (I/O) interface 530. Computing device 500 further includes a network interface 540 coupled to I/O interface 530, and one or more input/output devices 550, such as cursor control device 560, keyboard 570, and display(s) 580. In various embodiments, any of the components can be utilized by the system to receive user input described above. In various embodiments, a user interface can be generated and displayed on display 580. In some cases, it is contemplated that embodiments can be implemented using a single instance of computing device 500, while in other embodiments multiple such systems, or multiple nodes making up computing device 500, can be configured to host different portions or instances of various embodiments. For example, in one embodiment some elements can be implemented via one or more nodes of computing device 500 that are distinct from those nodes implementing other elements. In another example, multiple nodes may implement computing device 500 in a distributed manner.

In different embodiments, computing device 500 can be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computing device 500 can be a uniprocessor system including one processor 510, or a multiprocessor system including several processors 510 (e.g., two, four, eight, or another suitable number). Processors 510 can be any suitable processor capable of executing instructions. For example, in various embodiments processors 510 may be general-purpose or embedded processors implementing any of a variety of instruction set architectures (ISAs). In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above can be stored within system memory 520. In other embodiments, program instructions and/or data can be received, sent or stored upon different types of computer-accessible media or on similar media separate from system memory 520 or computing device 500.

In one embodiment, I/O interface 530 can be configured to coordinate I/O traffic between processor 510, system memory 520, and any peripheral devices in the device, including network interface 540 or other peripheral interfaces, such as input/output devices 550. In some embodiments, I/O interface 530 can perform any necessary protocol, timing or other data transformations to convert data signals from one component (e.g., system memory 520) into a format suitable for use by another component (e.g., processor 510). In some embodiments, I/O interface 530 can include support for devices attached through various types of peripheral buses, such as a variant of the Peripheral Component Interconnect (PCI) bus standard or the Universal Serial Bus (USB) standard, for example. In some embodiments, the function of I/O interface 530 can be split into two or more separate components, such as a north bridge and a south bridge, for example. Also, in some embodiments some or all of the functionality of I/O interface 530, such as an interface to system memory 520, can be incorporated directly into processor 510.

Network interface 540 can be configured to allow data to be exchanged between computing device 500 and other devices attached to a network (e.g., network 590), such as one or more external systems or between nodes of computing device 500. In various embodiments, network 590 can include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 can support communication via wired or wireless general data networks, such as any suitable type of Ethernet network, for example; via digital fiber communications networks; via storage area networks such as Fiber Channel SANs, or via any other suitable type of network and/or protocol.

Input/output devices 550 can, in some embodiments, include one or more display terminals, keyboards, keypads, touchpads, scanning devices, voice or optical recognition devices, or any other devices suitable for entering or accessing data by one or more computer systems. Multiple input/output devices 550 can be present in computer system or can be distributed on various nodes of computing device 500. In some embodiments, similar input/output devices can be separate from computing device 500 and can interact with one or more nodes of computing device 500 through a wired or wireless connection, such as over network interface 540.

Figure 6:
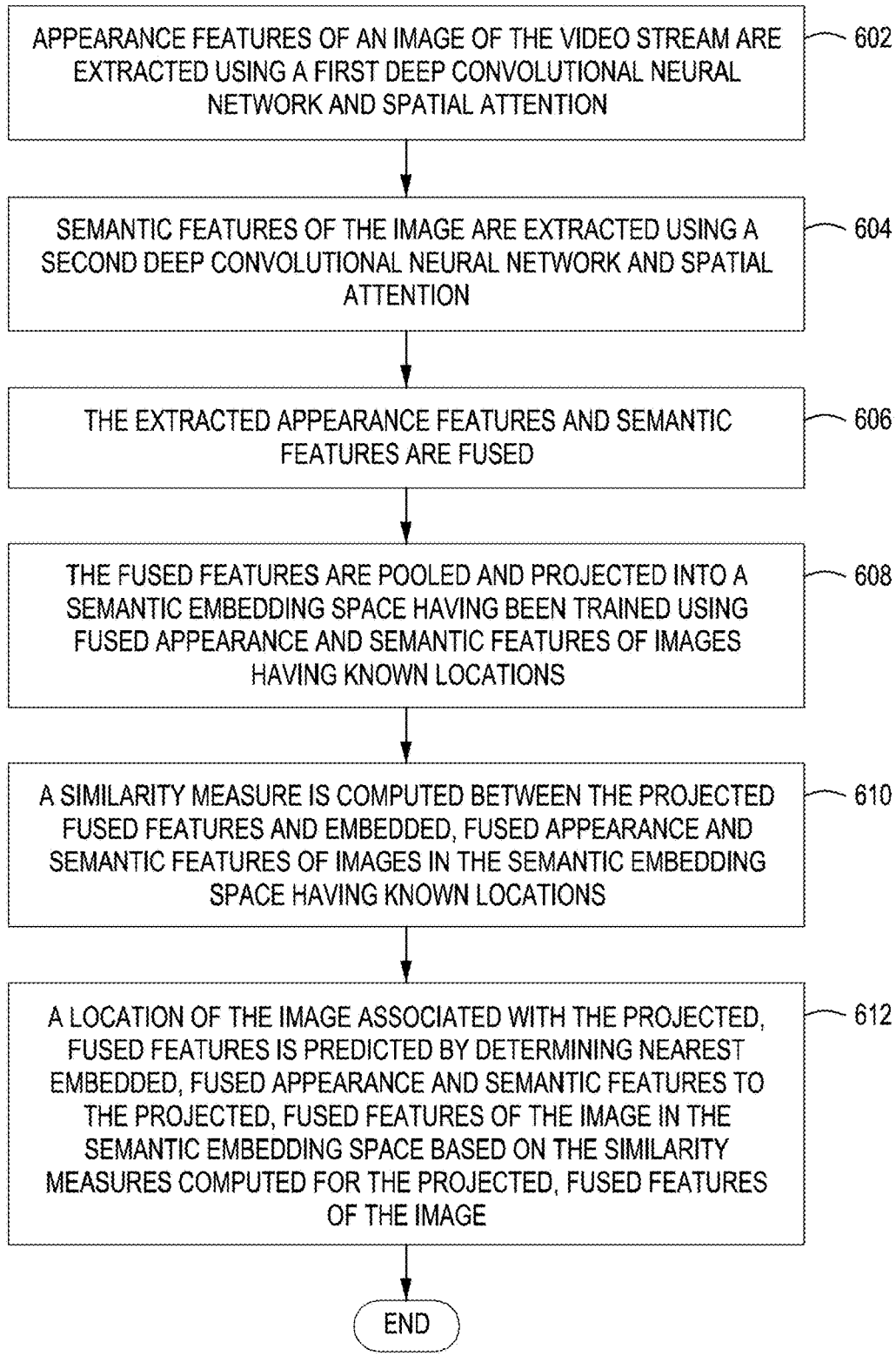
FIG. 6 depicts a flow diagram of a method for visual localization of images of a video stream in accordance with an embodiment of the present principles.
Figure 7:
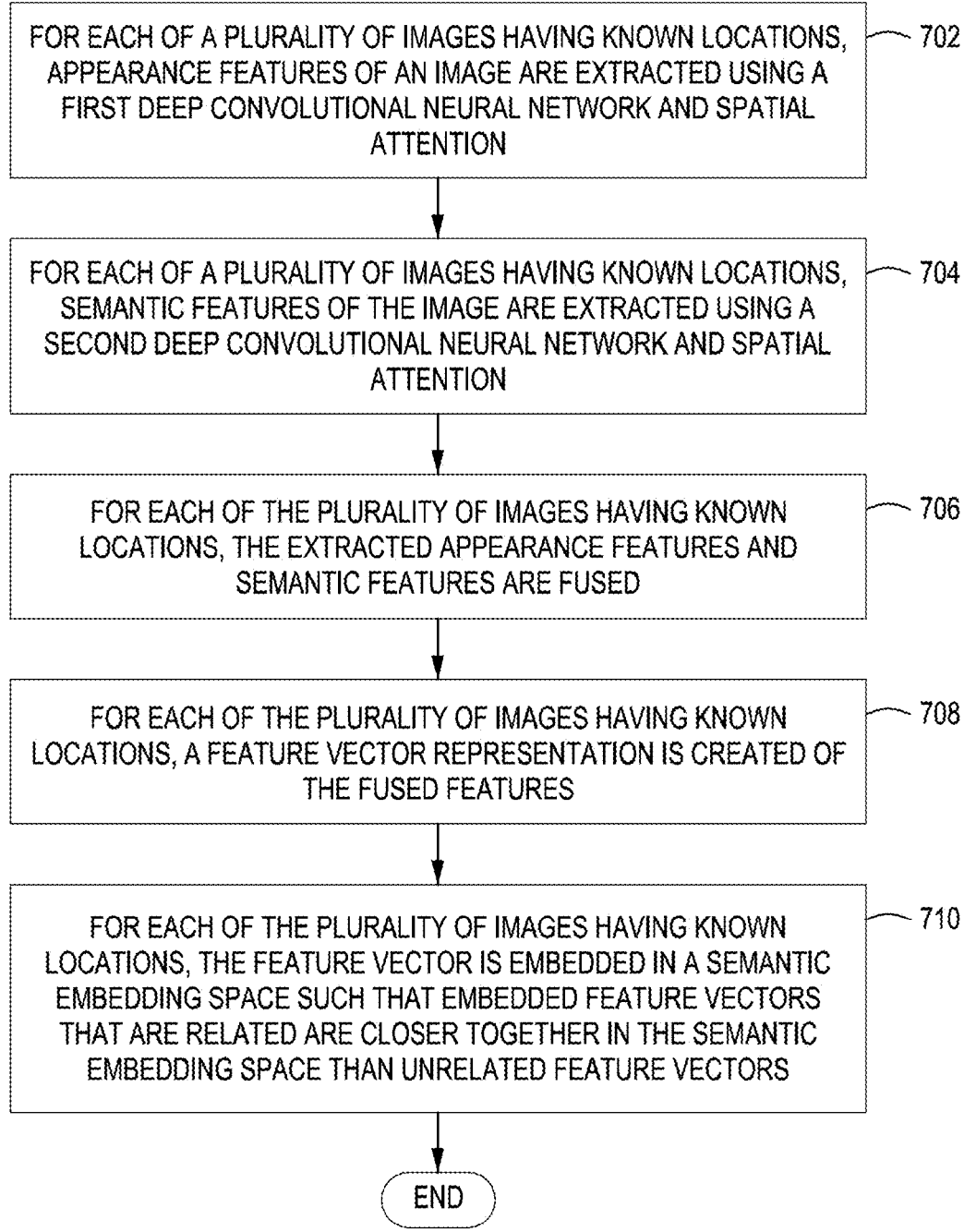
FIG. 7 depicts a flow diagram of a method for creating a semantic embedding space for improved visual localization of an image in accordance with an embodiment of the present principles.

In some embodiments, the illustrated computing device 500 can implement any of the operations and methods described above, such as the methods illustrated by the flowcharts of FIG. 6 and FIG. 7. In other embodiments, different elements and data can be included.

Those skilled in the art will appreciate that computing device 500 is merely illustrative and is not intended to limit the scope of embodiments. In particular, the computer system and devices can include any combination of hardware or software that can perform the indicated functions of various embodiments, including computers, network devices, Internet appliances, PDAs, wireless phones, pagers, and the like. Computing device 500 can also be connected to other devices that are not illustrated, or instead can operate as a stand-alone system. In addition, the functionality provided by the illustrated components can in some embodiments be combined in fewer components or distributed in additional components. Similarly, in some embodiments, the functionality of some of the illustrated components may not be provided and/or other additional functionality can be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software components can execute in memory on another device and communicate with the illustrated computer system via inter-computer communication. Some or all of the system components or data structures can also be stored (e.g., as instructions or structured data) on a computer-accessible medium or a portable article to be read by an appropriate drive, various examples of which are described above. In some embodiments, instructions stored on a computer-accessible medium separate from computing device 500 can be transmitted to computing device 500 via transmission media or signals such as electrical, electromagnetic, or digital signals, conveyed via a communication medium such as a network and/or a wireless link. Various embodiments can further include receiving, sending or storing instructions and/or data implemented in accordance with the foregoing description upon a computer-accessible medium or via a communication medium. In general, a computer-accessible medium can include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

FIG. 6 depicts a flow diagram of a method 600 for visual localization of images of a video stream in accordance with an embodiment of the present principles. The method 600 begins at 602 during which appearance features of an image of the video stream are extracted using a first neural network, such as a deep convolutional neural network, and spatial attention. The method 600 can proceed to 604.

At 604, semantic features of the image are extracted using a second neural network, such as a deep convolutional neural network, and spatial attention. The method 600 can proceed to 606.

At 606, the extracted appearance features and semantic features are fused. The method 600 can proceed to 608.

At 608, the fused features are pooled and projected into a semantic embedding space having been trained using fused appearance and semantic features of images having known locations. The method 600 can proceed to 610.

At 610, a similarity measure is computed between the projected fused features and embedded, fused appearance and semantic features of images in the semantic embedding space having known locations. The method 600 can proceed to 612.

At 612, a location of the image associated with the projected, fused features is predicted by determining nearest embedded, fused appearance and semantic features to the projected, fused features of the image in the semantic embedding space based on the similarity measures computed for the projected, fused features of the image. The method 600 can be exited.

FIG. 7 depicts a flow diagram of a method 700 for creating a semantic embedding space for improved visual localization of an image in accordance with an embodiment of the present principles. The method 700 begins at 702 during which, for each of a plurality of images having known locations, extracting appearance features of an image using a first neural network and spatial attention. The method 700 can proceed to 704.

At 704, for each of the plurality of images having known locations, extracting semantic features of the image using a second neural network and spatial attention. The method can proceed to 706.

At 706, for each of the plurality of images having known locations, fusing the extracted appearance features and semantic features. The method 700 can proceed to 708.

At 708, for each of the plurality of images having known locations, creating a feature vector representation of the fused features. The method 700 can proceed to 710.

At 710, for each of the plurality of images having known locations, semantically embedding the feature vector in a semantic embedding space such that embedded feature vectors that are related are closer together in the semantic embedding space than unrelated feature vectors. The method 700 can be exited.

In some embodiments, extracting semantic features of images for use in the above described visual localization process in accordance with the present principles is not a straightforward or easy process. For example, images/data from some sensors, such as Light Detection and Ranging (LIDAR) sensors, Radio Detection and Ranging (RADAR) sensors, 3D Computer Aided Design (CAD) modeling and the like do not translate easily into semantic features. More specifically, it is difficult to obtain or annotate semantic segmentation maps for LIDAR depth images and the like. In such embodiments, to overcome the difficulty of obtaining or annotating semantic segmentation maps for LIDAR depth images and the like, in some embodiments of the present principles a common embedding space is trained with paired images/data captured from the same geo-location but with at least two different sensors.

In some embodiments, weak supervision from the RGB modality is used to train a semantic segmentation network for other modalities, such as the LIDAR depth images, RADAR images and 3D CAD images, by using a triplet ranking loss to embed different modalities into a common embedding space using training pairs.

In some embodiments, the feature vector of an RGB image and a LIDAR depth image are denoted as g ($\in \mathbb{R}^J$) and ($\in \mathbb{R}^L$), respectively. A linear projection can be used to project both modalities in a common space according to $r_p = W^{(r)}g$ ($r_p \in \mathbb{R}^J$) and $d_p = W^{(d)}a$ ($d_p \in \mathbb{R}^J$) where the transformation matrices for the RGB and LIDAR depth maps are $W^i \in \mathbb{R}^{J \times I}$ and $W^d \in \mathbb{R}^{J \times L}$, respectively. Using pairs of feature representations of RGB images and corresponding depth images, a joint embedding can be learned such that the positive pairs are closer than the negative pairs in the common space. As previously recited above, such arrangement can be achieved by using a bi-directional triplet ranking loss according to equation nine (9), which follows:

$$\mathcal{L}_p = \max_{\hat{d}_p}[\Delta - S(r_p, d_p) + S(r_p, \hat{d}_p)] + \max_{\hat{r}_p}[\Delta - S(r_p, d_p) + S(\hat{r}_p, d_p)], \quad (9)$$

where $[x]_+ = \max(x, 0)$, $\mathcal{L}_p$ is the loss for a positive pair $(r_p, d_p)$, $\hat{r}_p, \hat{d}_p$ are the negative pairs for $r_p$ and $d_p$, respectively, and $\Delta$ is the margin value for the ranking loss. In some embodiments, a cosine similarity is used as the scoring function, $S(r_p, d_p)$, which measures a similarity between inputs from both modalities.

In some embodiments in accordance with the present principles, segmentations maps (e.g., semantic segmentation maps) from the paired RGB image can be used as the ground-truth maps to train the segmentation network for the other modalities, such as the LIDAR depth maps. That is, due to the alignment between the modalities, RGB segmentation maps contain sufficiently rich signals to train a segmentation network for the LIDAR depth images.

Figure 8:
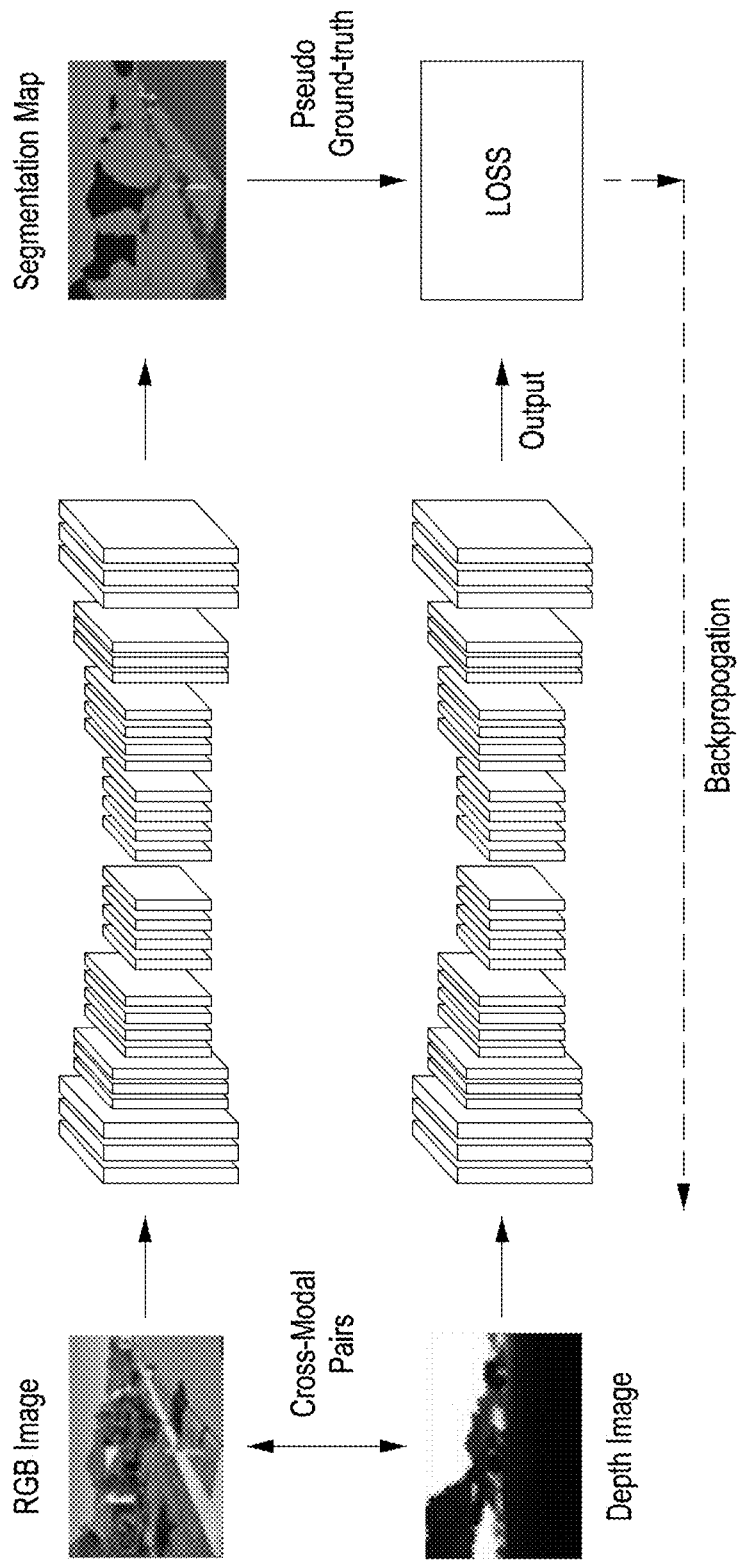
FIG. 8 depicts a functional diagram of an embodiment for using weak supervision available from cross-modal pairs to learn a segmentation network for the modality in accordance with an embodiment of the present principles.

FIG. 8 depicts a functional diagram of an embodiment for using the weak supervision available from cross-modal pairs to learn a segmentation network for the modality with no labeled examples in accordance with the present principles. That is, FIG. 8 depicts two parallel convolutional neural networks. The first (top) has been trained to output semantic segmentation maps from RGB imagery, and the weights are kept fixed. The second (bottom) is then trained for semantic segmentation of depth imagery using the outputs of the first. Specifically, in the embodiment of FIG. 8, semantic segmentation maps for an image from the RGB network can be used to learn a segmentation network for the LIDAR depth images. More specifically, for the embodiment of FIG. 8, at the time of retrieval, given a query ground RGB image, r, a similarity score can be computed for a query ground RGB image with each one of the LIDAR depth image, d, in a dataset in the common embedding space and a fusion of the similarity scores can be used for a final ranking according to equation ten (10), which follows:

$$S(r,d) = w_1 S_{App\text{-}App}(r,d) + w_2 S_{App\text{-}Sem}(r,d) + w_3 S_{Sem\text{-}App}(r,d) + w_4 S_{Sem\text{-}Sem}(r,d), \quad (10)$$

where the hyphen (-) symbol in the subscripts below S separate features from Ground-RGB and LIDAR-Depth used in learning joint representations. For example, $S_{App\text{-}Sem}$ refers to the similarity score calculated in the joint space trained with appearance features from RGB and semantic features from depth. In some embodiments, the values of $w_1, w_2, w_3, w_4$ are chosen empirically based on the validation set.

In an experimental embodiment, to explore the geo-localization scheme using cross-modal cross-view ground RGB to aerial LIDAR matching in accordance with the present principles, a new dataset which contains over 550K location-coupled pairs of ground RGB images and reference depth images collected from aerial LIDAR point cloud were collected by the inventors. The dataset will be referred to throughout this disclosure as the Ground RGB to Aerial LIDAR (GRAL) localization dataset.

Figure 9:
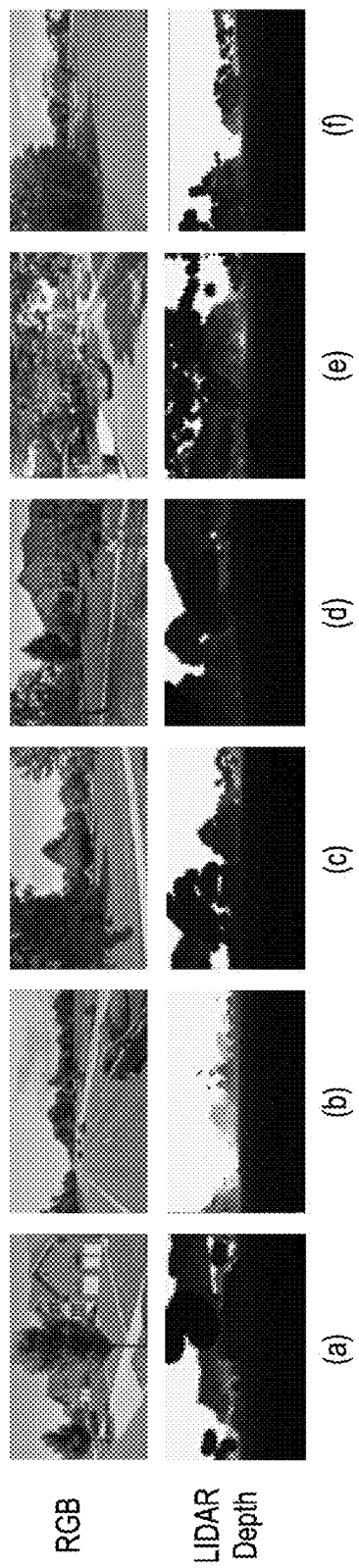
FIG. 9 depicts some exemplary RGB and LIDAR depth paired images from the GRAL localization dataset in accordance with an embodiment of the present principles.

FIG. 9 depicts some exemplary RGB and LIDAR depth paired images from the GRAL localization dataset in accordance with an embodiment of the present principles. That is, in the paired images of FIG. 9, it can be seen that dynamic objects, as people or vehicles, are missing from the depth images and thus add noise to the semantic alignment task. Also, the RGB and depth data may have been collected at different times, leading to different appearances of trees and buildings between the two. In the embodiment of FIG. 9, the RGB images were collected from Google Street-View and the LIDAR depth images were collected by rending LIDAR point cloud images from the United States Geological Survey (USGS).

In an experimental embodiment, to ensure that each ground RGB image is paired with a single distinct depth image from aerial LIDAR, the GRAL dataset was created in two phases. First, available street-view images were downloaded in the selected area for different GPS locations (i.e., latitude, longitude) using Google Street View API. Second, a LIDAR scan of the selected area was used from USGS to create a Digital Elevation Model (DEM) and from the DEM, location-coupled LIDAR depth images are collected for each street-view image. For each location, twelve (12) heading directions (0_ to 360_ at 30_ intervals) were used for data collection.

For harvesting ground RGB images, street-view images were collected by densely sampling GPS locations. As ground images are only available on streets from Google Street View, RGB imagery is not available in many locations in the selected area and Google returns a generic image for these locations. As such, image metadata from the street-view API was used to filter these images. It was ensured that selected locations were 5 meters apart as it was empirically found that spacing the samples around 5 meters apart tended to get a new image. About 60K GPS coordinates on street were ultimately listed for data collection. The image pixel size was hard set at (640×480), the horizontal field of view was hard set as 90 and the pitch was hard set as 0 for the API.

For harvesting LIDAR Depth Images, aerial LIDAR point-cloud of the selected area was collected to create a DEM which is rendered exhaustively from multiple locations and viewpoints. For each GPS location containing RGB images, the LIDAR depth images was rendered from 1.7 m above ground. A digital surface model was used for height correction above sea level. The depth images with no height correction and corresponding RGB images were removed as it was empirically found that the viewpoint of these depth images are different from paired RGB images in most such cases. The pairs where more than 60% of the pixels were black in the depth image were also removed from the dataset.

In an experimental embodiment for retrieving airborne LIDAR depth images from ground-level RGB image queries in accordance with the present principles, R@K (Recall at K) was implemented to calculate the percentage of test samples for which the correct result is found in the top-K retrieved points for a query. Results are reported for R@1, R@5 and R@10. Median Rank (MedR) was implemented to calculate the average median ranks of the ground-truth results in the retrieved results. In such experiment, 5 m R@1 was also reported, which calculates the percentage of test samples for which the best matching sample is found within a five (5) meter distance to the query.

In the experimental embodiment, the joint embedding models were trained using a two-branch deep neural network framework. Each branch was implemented with an expert deep network for a specific modality followed by fully connected embedding layers. The idea was that first, the expert networks focus on identifying modality-specific representations and the embedding layers transform the representations to joint representations between aligned modalities. For encoding the respective images, two pre-trained CNNs were used. One of the CNNs was trained for image classification task and the other was trained for the semantic segmentation task. Feature maps from the classification network were considered as appearance features and feature maps from the segmentation network were considered as semantic features. In a specific embodiment, an 18 layer Wide-ResNet model was trained on the Places365 dataset as the image classification network and a VGG16 encoder based SegNet model was trained on the Cityscapes dataset as the segmentation network. Features were extracted directly from the penultimate fully connected layer in Wide-ResNet18 and from the last encoder layer in SegNet.

Similarly for extracting appearance feature from depth images, a pre-trained Wide-ResNet18 was used. However, the segmentation network was trained using weak, cross-modal supervision as described above and in accordance with embodiments of the present principles. That is, the network was used for semantic feature extraction from depth images in accordance with embodiments of the present principles.

ADAMoptimizer was used for training the joint embedding model. To train the joint embedding model, the inventors began with a learning rate of 0:002 and dropped the rate by 10 every 15 epochs. The joint embedding model was trained for 40 epochs using a batch-size of 128. The inventors experimented with different values for margin, A, and empirically selected 0:2. The model was evaluated on the validation set after every epoch and the model with the best sum of recalls was selected as the final model.

The semantic segmentation network was trained with a starting learning rate of 0:01. The rate was decreased when the training loss reached a plateau. The network was initialized using a model pre-trained on Cityscapes. A batch-size of four (4) was used in training. For decreasing the effect of imbalance between the classes, a weight contribution was selected for each instance to loss value with approximate inverse class frequency.

FIG. 10 depicts a Table 1 highlighting the benefits of using semantic information for visual localization and for fusion of embedding in accordance with embodiments of the present principles. Table 1 of FIG. 10 is divided into 3 rows (1.1-1.3) to present an outcome of different aspects of the present principles. In row 1.1, results of utilizing different combination of appearance and semantic features from RGB and LIDAR depth images for learning a joint embedding are presented. In row-1.2, results for joint embedding learned utilizing features that are direct concatenation of appearance and semantic features are presented. Finally, in row-1.3, result based on the method that employs a fusion of multiple embeddings for retrieval are presented.

In Table 1 of FIG. 10, the hyphen (-) symbol separates features from, for example, Ground-RGB and LIDAR-Depth used in learning joint representations. For example, in Table 1 of FIG. 10, an App-Sem method refers to an embedding learned using appearance feature from RGB and semantic feature from depth images. In addition, in Table 1 of FIG. 10, the plus (+) symbol is used for representing an ensemble of embeddings and the vertical bar (I) symbol is used for representing feature concatenation.

To evaluate the performance of using different combinations of appearance and semantic features in training joint embeddings, the results in row-1.1 of Table 1 of FIG. 10 can be evaluated. As depicted in row-1.1 of Table 1, utilizing appearance features from both ground RGB and aerial LIDAR depth images results in the best performance.

In comparing row-1.1 and row-1.2, it can be observed that a concatenation of appearance and semantic feature from both ground RGB and LIDAR depth performs even worse than utilizing only appearance feature in R@1. Utilizing concatenation of appearance and semantic features from both ground RGB, and only appearance from depth images results in a slight improvement in R@1. Although Table 1 presents some improvement in other metrics, the overall improvement is very limited. The inventors believe that appearance and semantic cues get suppressed in such concatenation as appearance and semantic cues are complementary cues and focus on different entities in the images.

By comparing row-1.3 with row-1.1 of Table 1, it can be observed that the fusion of multiple embeddings in accordance with embodiments of the present principles shows significant improvement over using only a single joint space for retrieval. It can be observed that that the fusion of multiple embeddings in accordance with embodiments of the present principles (as shown in row-1.3) achieves more than a seven (7) point improvement in R@1 and a twelve (12) point improvement in R@10 compared to the best performing App-App model shown in row-1.1. It can also be observed from row-1.3 of Table 1 that utilizing semantic cues extracted by the trained LIDAR segmentation network in accordance with the present principles results in significant improvement in performance.

Although in some embodiments described above, signals from a LIDAR sensor are embedded in a common embedding space with paired images/data (e.g., RGB images/data) captured from the same geo-location, in some embodiments in accordance with the present principles, alternatively or in addition images/data from other sensors, such as 3D CAD models, EO camera imagery/video, IR camera imagery/video, Synthetic Aperture Radar (SAR), Digital Terrain Elevation Data, acoustic sensors (multi-static sonars), RADAR, above water sensors, active sonars captured from the same geo-location from a same point of view can be paired as described above and embedded in a common embedding space in accordance with the present principles. The data from the various sensors can be used to train an object classifier as described above for providing improved sensors.

Furthermore, in some embodiments, alternatively or in addition images/data from sensors, such as aerial or satellite imagery, IR, etc., captured from the same geo-location from a different point of view can also be paired as described above and embedded in a common embedding space in accordance with the present principles.

That is, in accordance with some embodiments of the present principles, an observation of a scene, captured using several different modalities is considered. The scene images/data can be from the same point of view, such as paired camera and LIDAR, or different points of view, such as aerial or satellite imagery, IR, etc. A set of deep neural networks specific to each modality is implemented for extracting a set of modality-specific features for the scene images/data. The set of features is processed jointly by a multimodal embedding model of the present principles, to produce a singular, fused representation that encodes all modalities of the observation into a single vector embedding. The joint representations can be used for some downstream task, such as entity detection or classification on the initial observation. A network can be trained end-to-end, such that both the specific task, as well as the structure of the multimodal embedding space, can be jointly optimized.

Figure 11:
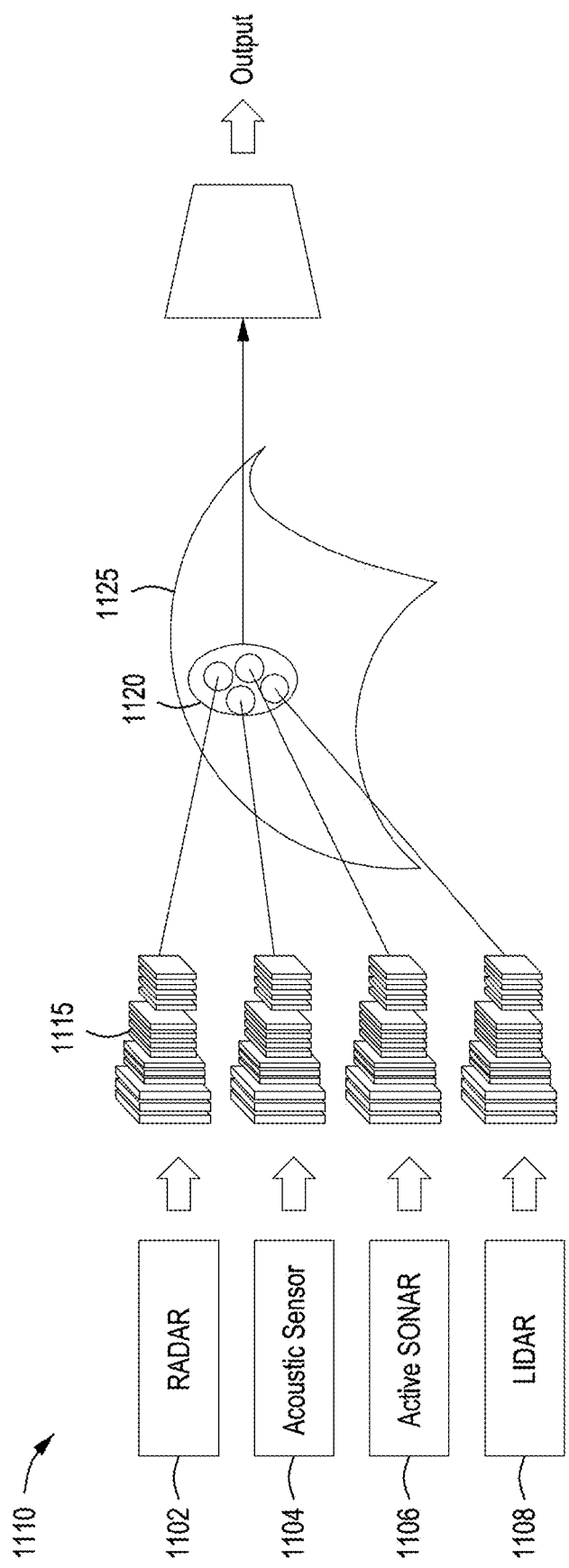
FIG. 11 depicts a high level functional diagram of a multi-sensor fusion system 1100 in accordance with an embodiment of the present principles.

For example, FIG. 11 depicts a high level functional diagram of a multi-sensor fusion system 1100 in accordance with an embodiment of the present principles. In the embodiment of FIG. 11, images/data of a same geo-location are captured by a plurality of, illustratively five (5), sensor modalities, illustratively a RADAR sensor 1102, an Acoustic sensor 1104, and active SONAR sensor 1106, and a LIDAR sensor 1108 (collectively sensors 1110). The respective images/data from each of the sensors 1110 is communicated to a respective data processing section, collectively 1115.

At the respective data processing sections 1115, images/data from each of the sensor modalities 1110 is mapped individually using a sensor-specific neural network, such as deep convolutional neural networks, into a joint multi-modal embedding space as described above. In some embodiments, a late fusion approach learns the optimal combination across different sensors through the deep embedding network. In such embodiments, training is conducted by semi-supervising sensor data from a same geographic position to be close (compared to data from different areas) in the embedding space. As depicted in the embodiment of FIG. 11, the embedding is a mapping of input data into a vector representation 1120 that spans an embedding space 1125. That is, as depicted in FIG. 11, the embedding of the images/data of the sensors in accordance with the present principles produces a singular, fused representation 1120 that encodes all modalities of the observation into the embedding space 1125.

The embedding space 1125 can then be used in accordance with the above described embodiments of the present principles for different tasks such as target detection, target recognition, structure classification and the like. In some embodiments, the trained embedding space in accordance with the present principles can also directly support visual change detection. In some embodiments, the trained embedding space is capable of enabling the prediction/retrieving of a location for each of a given set of search images. In this way, it is possible to group together sets of images captured in the same or close locations. In some embodiments, the learned spatial attention from the semantic branch focuses on semantically-consistent regions of each image and effectively ignores distracting, dynamic objects. Taken together, change detection can be accomplished, as the outputs of a search of the trained embedding space not only matches images from a same or similar area, but also ignores (semantically) irrelevant areas containing distracting changes and focuses on those changes which are meaningful to the downstream task/algorithm.

In some embodiments, a multi-sensor fusion system in accordance with the present principles, such as the multi-sensor fusion system 1100 of FIG. 11, can be implemented by a visual localization system in accordance with the present principles, such as the visual localization system 100 of FIG. 1. For example, in some embodiments, images/data captured by a plurality of sensor modalities can be communicated to an appearance detection module at which respective, specialized neural networks can be applied to determine features. The output of the appearance detection module can be communicated to a modality fusion module to fuse the appearance features and then communicated to a pooling module to pool the fused features and project the fused features into the embedding space as described above.

Some use applications for the above described embodiments of the present principles can include, but are not limited to, at least one of Change detection, Autonomous navigation and Dynamic scene prediction. More specifically, when performing automatic change detection, there can be many differences between two frames that constitute changes that are irrelevant to the task. For example, the differences can result from newly-cast shadows in ground imagery or parallax in satellite imagery. There can even be actual scene changes that are out-of-scope for the current task: an algorithm for detecting construction of new roads need not be distracted by nearby building construction. In this way, embodiments of the present principles can be used to control and refine the image features by implicitly learning which semantic regions of the input are most useful for performing the downstream task at least as described above. For example, in aerial and satellite imagery, distracting pixel changes can be ignored and a change detection algorithm can instead be focused on semantically meaningful regions as described above in accordance with embodiments of the present principles.

Perception and localization are both key components to an autonomous navigation system. In some embodiments in accordance with the preset principles, a database of image descriptors are determined that are invariant to changes in weather or time of day as described above. Similarly, embodiments of the present principles naturally extend to unmanned aerial vehicles (UAV), in which case images can be constructed and matched against a database by learning image descriptors, as described above, from images taken using, for example, a downward facing camera. In this case, embodiments of the present principles can be useful to make a mapping procedure robust to seasonal changes, which can be particularly dramatic from an aerial view, and to better discriminate between repetitive and monotonous land features. Embodiments in accordance with the present principles, given appropriate feature extractors, can further extend to the underwater scenario, in which an unmanned underwater vehicle (UUV) can be operating with a radar sensor, or other similar sensor, rather than an RGB camera.

The task of dynamic scene prediction complements and combines the requirements of the prior described change detection and autonomous navigation cases. In dynamic scene prediction, an autonomous vehicle can be moving in an environment in which the vehicle not only needs to localize itself but also needs to predict how dynamic objects in the scene (such as other vehicles) will behave in order to navigate safely. As in change detection, not all regions of the vehicle's field of view are equally likely to move or change. It is more useful and efficient to focus on known types of dynamic objects and ignore static scene elements, such as signs or buildings. Embodiments of the present principles enable these regions to be inferred dynamically during learning. It can be demonstrated through the visual localization tasks of the present principles, at least as described above, that some knowledge is developed about which scene regions correspond to dynamic objects—and thus ignores such scenes for the above described mapping procedure. Thus, the inverse of this information could be equally used to focus one-step-ahead scene prediction on just these regions.

Figure 12:
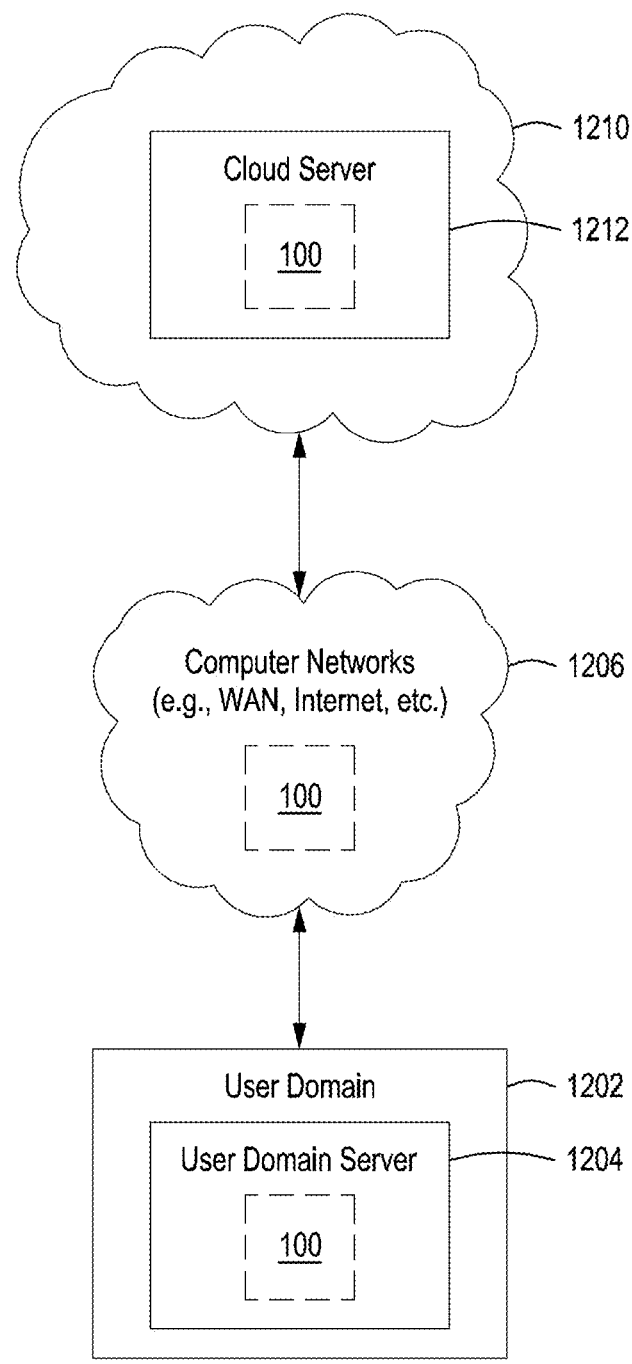
FIG. 12 depicts a high level block diagram of a network in which embodiments of a visual localization system and/or a multi-sensor fusion system in accordance with the present principles can be applied.

FIG. 12 depicts a high level block diagram of a network in which embodiments of a visual localization system and/or a multi-sensor fusion system in accordance with the present principles can be applied. The network environment 1200 of FIG. 12 illustratively comprises a user domain 1202 including a user domain server 1204. The network environment 1200 of FIG. 12 further comprises computer networks 1206, and a cloud environment 1210 including a cloud server 1212.

In the network environment 1200 of FIG. 12, a visual localization system and/or a multi-sensor fusion system in accordance with the present principles, such as the visual localization system 100 of FIG. 1 and the multi-sensor fusion system 1100 of FIG. 11, can be included in at least one of the user domain server 1204, the computer networks 1206 and the cloud server 1212. That is, in some embodiments, a user can use a local server (e.g., the user domain server 1204) to provide images/data and videos that can be used to train a semantic space in accordance with the present principles and on which visual localization is to be performed.

In some embodiments, a user can implement a visual localization system and/or a multi-sensor fusion system in the computer networks 1206 to provide images/data and videos that can be used to train a semantic space in accordance with the present principles and on which visual localization is to be performed in accordance with the present principles. Alternatively or in addition, in some embodiments, a user can implement a visual localization system and/or a multi-sensor fusion system in the cloud server 1212 of the cloud environment 1210 to provide images/data and videos that can be used to train a semantic space in accordance with the present principles and on which visual localization is to be performed in accordance with the present principles. For example, in some embodiments it can be advantageous to perform processing functions of the present principles in the cloud environment 1210 to take advantage of the processing capabilities of the cloud environment 1210. In some embodiments in accordance with the present principles, a visual localization system and/or a multi-sensor fusion system can be located in a single or multiple locations/servers/computers to perform all or portions of the herein described functionalities of a visual localization system and/or a multi-sensor fusion system in accordance with the present principles.

The methods and processes described herein may be implemented in software, hardware, or a combination thereof, in different embodiments. In addition, the order of methods can be changed, and various elements can be added, reordered, combined, omitted or otherwise modified. All examples described herein are presented in a non-limiting manner. Various modifications and changes can be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances can be provided for components described herein as a single instance. Boundaries between various components, operations and data stores are somewhat arbitrary, and particular operations are illustrated in the context of specific illustrative configurations. Other allocations of functionality are envisioned and can fall within the scope of claims that follow. Structures and functionality presented as discrete components in the example configurations can be implemented as a combined structure or component. These and other variations, modifications, additions, and improvements can fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure can be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described can include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure can be implemented in hardware, firmware, software, or any combination thereof. Embodiments can also be implemented as instructions stored using one or more machine-readable media, which may be read and executed by one or more processors. A machine-readable medium can include any mechanism for storing or transmitting information in a form readable by a machine (e.g., a computing device or a "virtual machine" running on one or more computing devices). For example, a machine-readable medium can include any suitable form of volatile or non-volatile memory.

Modules, data structures, and the like defined herein are defined as such for ease of discussion and are not intended to imply that any specific implementation details are required. For example, any of the described modules and/or data structures can be combined or divided into sub-modules, sub-processes or other units of computer code or data as can be required by a particular design or implementation.

In the drawings, specific arrangements or orderings of schematic elements can be shown for ease of description. However, the specific ordering or arrangement of such elements is not meant to imply that a particular order or sequence of processing, or separation of processes, is required in all embodiments. In general, schematic elements used to represent instruction blocks or modules can be implemented using any suitable form of machine-readable instruction, and each such instruction can be implemented using any suitable programming language, library, application-programming interface (API), and/or other software development tools or frameworks. Similarly, schematic elements used to represent data or information can be implemented using any suitable electronic arrangement or data structure. Further, some connections, relationships or associations between elements can be simplified or not shown in the drawings so as not to obscure the disclosure.

This disclosure is to be considered as exemplary and not restrictive in character, and all changes and modifications that come within the guidelines of the disclosure are desired to be protected.

The invention claimed is:

1. A method for visual localization of an image, the method comprising:
    extracting appearance features of the image using a first neural network and a spatial attention function;
    extracting semantic features of the image using a second neural network and the spatial attention function;
    fusing the extracted appearance features and semantic features;
    pooling the fused features and projecting the pooled, fused features into a semantic embedding space having been trained using fused appearance and semantic features of images having known locations;
    computing a similarity measure between the projected, fused features and embedded, fused appearance and semantic features of images in the semantic embedding space having known locations; and
    predicting a location of the image associated with the projected, fused features by determining nearest embedded, fused appearance and semantic features to the projected, fused features of the image in the semantic embedding space based on the similarity measures computed for the projected, fused features of the image.

2. The method of claim 1, wherein the image comprises one of a Light Detection and Ranging image, a Radio Detection and Ranging image, or a 3D Computer Aided Design modeling image, and an image from a different sensor captured from a same geo-location as the one of a Light Detection and Ranging image, a Radio Detection and Ranging image, or a 3D Computer Aided Design modeling image is used to determine the semantic features of the image.

3. The method of claim 2, further comprising generating a common embedding space for determining the semantic features of the one of a Light Detection and Ranging image, a Radio Detection and Ranging image, or a 3D Computer Aided Design modeling image, the generating comprising;
    capturing image pairs from a same geo-location using at least two different sensors; and
    embedding the captured image pairs in the common embedding space such that embedded image pairs that comprise related content are embedded closer together in the common embedding space than image pairs that comprise unrelated content.

4. The method of claim 1, wherein the embedding space is trained by using a max-margin based triplet ranking loss function.

5. The method of claim 1, wherein at least one of a Specific Places Dataset, a Nordland dataset, a St. Lucia dataset, and an Oxford RobotCar dataset is used to train the semantic embedding space.

6. The method of claim 1, comprising:
    computing spatial attention using the spatial attention function by summarizing the appearance and the semantic features across spatial dimensions using average and max pooling and passing the appearance and semantic features through a multi-layer perceptron followed by an addition and a non-linearity.

7. The method of claim 6, wherein the non-linearity comprises a sigmoidal non-linearity.

8. The method of claim 1, comprising:
    pooling the fused features using spatial pyramid pooling.

9. The method of claim 1, comprising:
    pooling the fused features using NetVLAD pooling.

10. The method of claim 1, comprising:
    normalizing and scaling the embeddings and projections into the semantic embedding space.

11. The method of claim 10, wherein the embeddings and projections into the semantic embedding space are L2 normalized and scaled by a factor of 10.

12. The method of claim 1, wherein at least one of the first neural network and the second neural network comprises a ResNet50 network.

13. The method of claim 1, wherein at least one of the first neural network and the second neural network comprises a Pyramid Scene Parsing Network.

14. A method of creating a semantic embedding space for visual localization of an image, the method comprising:
    for each of a plurality of images having known locations;
    extracting appearance features of an image using a first neural network and a spatial attention function;
    extracting semantic features of the image using a second neural network and the spatial attention function;
    fusing the extracted appearance features and semantic features;
    creating a feature vector representation of the fused features; and
    semantically embedding the feature vector in a semantic embedding space such that embedded feature vectors that comprise related content are embedded closer together in the semantic embedding space than feature vectors that comprise unrelated content.

15. The method of claim 14, wherein the semantic embedding space is created using a max-margin based triplet ranking loss function.

16. The method of claim 14, wherein the plurality of images having known locations include images from at least one of a Specific Places Dataset, a Nordland dataset, a St. Lucia dataset, and an Oxford RobotCar dataset.

17. An apparatus for visual localization of an image, comprising:

an appearance detection module to extract appearance features of the image using a first neural network including a spatial attention function;

a semantic feature module to extract semantic features of the image using a second neural network including the spatial attention function;

a modality fusion module to fuse the appearance features and the semantic features using a shared channel attention;

an attention module to determine a spatial attention using the spatial attention function for the appearance features and the semantic features and to determine the shared channel attention for the fused features; and a pooling module to:
  pool the fused features and project the fused features into a semantic embedding space having been trained using fused appearance and semantic features of images having known locations;
  compute a similarity measure between the projected, fused features and embedded, fused appearance and semantic features of images in the semantic embedding space having known locations; and
  predict a location of the image associated with the projected, fused features by determining nearest embedded, fused appearance and semantic features to the projected, fused features of the image in the semantic embedding space based on the similarity measures computed for the projected, fused features of the image.

18. The apparatus of claim 17 where the image comprises one of a Light Detection and Ranging image, a Radio Detection and Ranging image, or a 3D Computer Aided Design modeling image, and the semantic feature module is further configured to use an image from a different sensor captured from a same geo-location as the one of a Light Detection and Ranging image, a Radio Detection and Ranging image, or a 3D Computer Aided Design modeling image to determine the semantic features of the image.

19. The apparatus of claim 18, wherein the apparatus is further configured to generate a common embedding space for determining the semantic features of the one of a Light Detection and Ranging image, a Radio Detection and Ranging image, or a 3D Computer Aided Design modeling image, the generating comprising;

capturing image pairs from a same geo-location using at least two different sensors; and embedding the captured image pairs in the common embedding space such that embedded image pairs that comprise related content are embedded closer together in the common embedding space than image pairs that comprise unrelated content.

20. The apparatus of claim 19, wherein the at least two different sensors comprise an RGB image sensor and a Light Detection and Ranging image sensor.

* * * * *